(12) United States Patent
Yang et al.

(10) Patent No.: US 11,971,377 B2
(45) Date of Patent: Apr. 30, 2024

(54) METHOD AND APPARATUS FOR TEMPERATURE GRADIENT MICROFLUIDICS

(71) Applicants: The Penn State Research Foundation, University Park, PA (US); MEDIMMUNE LLC, Gaithersburg, MD (US)

(72) Inventors: Tinglu Yang, State College, PA (US); Bradley Rogers, State College, PA (US); Jifeng Zhang, Newton, MA (US); Paul S. Cremer, State College, PA (US)

(73) Assignees: The Penn State Research Foundation, University Park, PA (US); MEDIMMUNE LLC, Gaithersburg, MD (US)

( * ) Notice: Subject to any disclaimer, the term of this patent is extended or adjusted under 35 U.S.C. 154(b) by 892 days.

(21) Appl. No.: 16/979,682

(22) PCT Filed: Mar. 12, 2019

(86) PCT No.: PCT/US2019/021885
§ 371 (c)(1),
(2) Date: Sep. 10, 2020

(87) PCT Pub. No.: WO2019/178121
PCT Pub. Date: Sep. 19, 2019

(65) Prior Publication Data
US 2021/0041379 A1 Feb. 11, 2021

Related U.S. Application Data

(60) Provisional application No. 62/641,978, filed on Mar. 12, 2018.

(51) Int. Cl.
*G01N 25/04* (2006.01)
*B01L 3/00* (2006.01)
(Continued)

(52) U.S. Cl.
CPC ............... *G01N 25/04* (2013.01); *B01L 7/54* (2013.01); *G01N 25/14* (2013.01);
(Continued)

(58) Field of Classification Search
CPC ........ G01N 25/04; G01N 25/14; G01N 25/02; B01L 7/54; B01L 3/502715; B01L 9/00;
(Continued)

(56) References Cited

U.S. PATENT DOCUMENTS 4,679,615 A * 7/1987 Livne .................. B01L 7/54
165/146
4,711,697 A * 12/1987 Kaukler ............... B01D 9/0013
356/30

(Continued)

FOREIGN PATENT DOCUMENTS

| WO | 2008115916 A1 | 9/2008 |
| WO | 2014085801 A1 | 6/2014 |
| WO | 2018104935 | 6/2018 |

OTHER PUBLICATIONS

Extended European Search Report issued in App. No. EP19767002, dated Oct. 22, 2021, 8 pages.
(Continued)

*Primary Examiner* — Nathaniel T Woodward
*Assistant Examiner* — Philip L Cotey
(74) *Attorney, Agent, or Firm* — Riverside Law LLP

(57) ABSTRACT

The present invention describes a versatile, robust and environmentally controlled platform with a linear temperature gradient for massively parallel chemical or biochemical processing. This apparatus is capable of probing the phase
(Continued)

transition behavior of macromolecules in solution, both thermodynamically and kinetically. This includes—but is not limited to—liquid/liquid phase transition behavior of antibody solutions and in situ gelation of thermo-responsive polymers. The device can be operated in a multiplex fashion using a controlled temperature gradient architecture and visualized by dark field microscopy or by other optical intensity measurements.

23 Claims, 18 Drawing Sheets

(51) Int. Cl.
| | | |
|---|---|---|
| *B01L 7/00* | (2006.01) | |
| *G01N 25/14* | (2006.01) | |
| *B01L 9/00* | (2006.01) | |
| *G01N 25/02* | (2006.01) | |

(52) U.S. Cl.
CPC .......... *B01L 3/502715* (2013.01); *B01L 9/00* (2013.01); *B01L 2300/042* (2013.01); *B01L 2300/0609* (2013.01); *B01L 2300/0627* (2013.01); *B01L 2300/1805* (2013.01); *B01L 2300/1816* (2013.01); *B01L 2300/1822* (2013.01); *B01L 2300/1894* (2013.01); *G01N 25/02* (2013.01)

(58) Field of Classification Search
CPC ....... B01L 2300/042; B01L 2300/0609; B01L 2300/0627; B01L 2300/1805; B01L 2300/1816; B01L 2300/1822; B01L 2300/1894
See application file for complete search history.

(56) References Cited

U.S. PATENT DOCUMENTS

| | | | | |
|---|---|---|---|---|
| 5,240,857 | A * | 8/1993 | Lahetkangas | C12M 41/14 165/146 |
| 5,459,300 | A * | 10/1995 | Kasman | B01L 3/50851 435/809 |
| 6,232,114 | B1 * | 5/2001 | Coassin | B01L 3/5085 422/430 |
| 6,337,435 | B1 * | 1/2002 | Chu | G05D 23/1919 422/550 |
| 6,485,625 | B1 * | 11/2002 | Simpson | B01J 19/0093 204/600 |
| 7,074,367 | B2 * | 7/2006 | Lurz | B01L 3/50853 436/155 |
| 7,164,077 | B2 * | 1/2007 | Venkatasubramanian | B01L 7/52 257/108 |
| 7,585,663 | B2 * | 9/2009 | Shigeura | G05D 23/22 435/303.1 |
| 8,900,811 | B2 * | 12/2014 | Sundberg | G01N 25/04 422/504 |
| 2002/0072112 | A1 * | 6/2002 | Atwood | G05D 23/1917 435/303.1 |
| 2002/0174660 | A1 * | 11/2002 | Venkatasubramanian | H10N 10/817 604/113 |
| 2003/0087292 | A1 * | 5/2003 | Chen | C12Q 1/6834 435/6.12 |
| 2004/0005720 | A1 * | 1/2004 | Cremer | B01L 3/50851 435/7.1 |
| 2004/0191754 | A1 * | 9/2004 | Meir | F26B 5/06 435/284.1 |
| 2004/0258568 | A1 * | 12/2004 | Lurz | B01L 7/525 422/552 |
| 2008/0006099 | A1 * | 1/2008 | Baumgardner | B01L 3/5027 422/82.12 |
| 2008/0138250 | A1 * | 6/2008 | Handique | H05K 3/10 422/400 |
| 2011/0032513 | A1 * | 2/2011 | Joanicot | G01N 35/085 422/68.1 |
| 2011/0084218 | A1 * | 4/2011 | Duhr | G01N 21/171 250/459.1 |
| 2012/0276541 | A1 * | 11/2012 | Lian | G01N 21/6452 435/6.12 |
| 2013/0065241 | A1 * | 3/2013 | Gale | B01L 7/525 435/6.12 |
| 2016/0377562 | A1 * | 12/2016 | Sundberg | C12Q 1/6844 435/6.12 |
| 2017/0074731 | A1 * | 3/2017 | Santhanagopalan | H01M 10/4285 |
| 2020/0209223 | A1 * | 7/2020 | Collins | A61K 49/0008 |

OTHER PUBLICATIONS

International Search Report issued in App. No. PCT/US2019/021885, dated May 28, 2019, 2 pages.

* cited by examiner

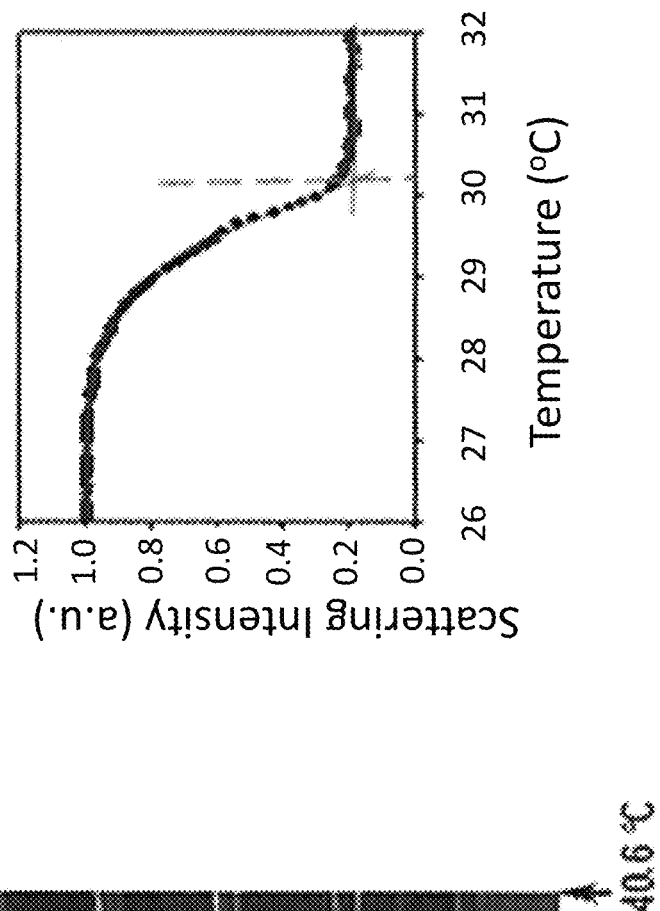
FIG. 2A
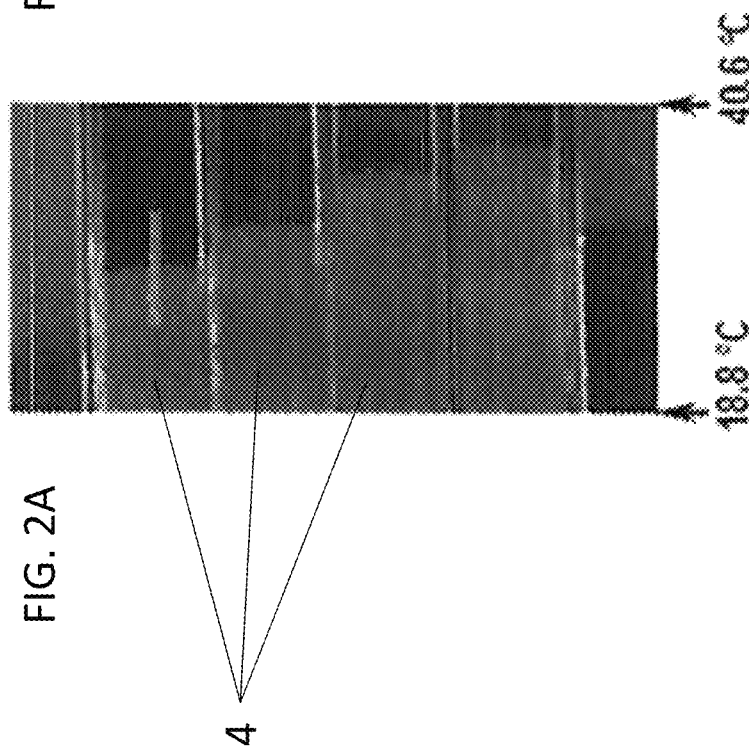
FIG. 2B
FIG. 2A – FIG. 2B

Extended Bellows

Pressed Bellows

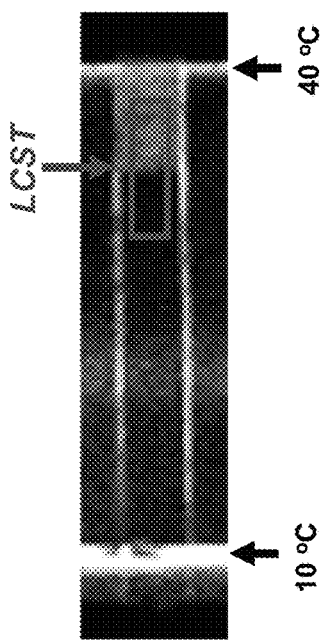
FIG. 14A
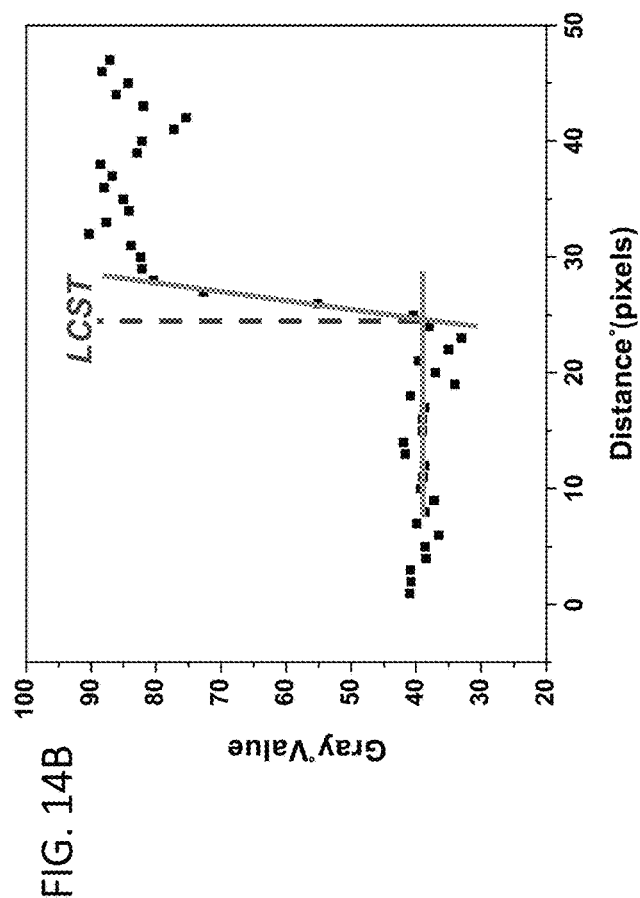
FIG. 14B
FIG. 14A – FIG. 14B

METHOD AND APPARATUS FOR TEMPERATURE GRADIENT MICROFLUIDICS

CROSS-REFERENCE TO RELATED APPLICATIONS

This application is the U.S. national phase application filed under 35 U.S.C. § 371 claiming benefit to International Patent Application No. PCT/US19/21885 filed Mar. 12, 2019, which is entitled to priority under 35 U.S.C. § 119(e) to U.S. Provisional Patent Application No. 62/641,978, filed Mar. 12, 2018, the contents of which are each incorporated by reference herein in their entirety.

BACKGROUND OF THE INVENTION

In the biopharmaceutical industry, there is an interest in studying the phase transition behavior of macromolecule solutions. Phase transition behavior is typically studied in macroscopic sample holders by light scattering, UV-Vis absorption measurements, differential scanning calorimetry, infrared spectroscopy, and temperature quenching-centrifugation. However, most of these methodologies have low-throughput, i.e. they are only suitable for one temperature experiment at a given time, and consume large amounts of sample, sometimes as much as hundreds of microliters. Thus, it is extremely difficult, labor intensive, and time-consuming to conduct the desired number of experiments to explore thermodynamic and kinetic properties of macromolecule solution using these techniques. Currently, there is no commercially available instrument platform to conduct both thermodynamic and kinetic measurements for phase behavior of macromolecule solutions, simultaneously.

This need in the field has led to development of technologies/devices that attempt to simultaneously measure liquid/liquid phase transition for protein solutions as a function of temperature and concentration. For example, attempts have been made to create a multichannel temperature gradient microfluidic device by dark field microscopy (Cremer et al., US 2004/005720). While these devices may possess the ability to simultaneously measure liquid/liquid phase transition for protein solutions, there are significant disadvantages. First, they fail to provide a design that is capable of providing a quick establishment of the temperature gradient and stability of the temperature gradient over time. Second, they lack adequate control over moisture surrounding the sample. Lastly, they lack any mechanism to prevent protein rich droplets (when formed) from rolling toward the hot or cold site which can affect the accuracy and precision of measurements.

Therefore, there is a need in the art for an improved device, system, and methods for the study of the macromolecular phase behavior under different solution conditions to determine the thermodynamic and kinetic aspects of a given macromolecule system. The present invention satisfies this need.

SUMMARY OF THE INVENTION

In one aspect, the present invention provides a temperature gradient device comprising: a planar, horizontally oriented base; a first thermoelectric cooler (TEC) having a hot surface and a cold surface, the first TEC positioned on the base with the hot surface facing upwards; a second TEC having a hot surface and a cold surface, the second TEC positioned on the base a distance away from the first TEC with the cold surface facing upwards; one or more sample holders, each sample holder positionable to touch a first end on the first TEC and a second opposing end on the second TEC; and a chamber secured to the base enclosing the first TEC, the second TEC, and the one or more sample holders, wherein the chamber is sealable with a lid.

In one embodiment, the first TEC and the second TEC are configured to generate a substantially linear temperature gradient between the first end and the opposing second end of each of the sample holders. In one embodiment, the first TEC and the second TEC are independently controllable. In one embodiment, at least a portion of the base comprises a heat sink touching the first TEC, the second TEC, or both.

In one embodiment, the base is connected to at least two leveling screws. In one embodiment, the first TEC and the second TEC are separated by an adjustable distance of between about 10 µm and 10 cm. In one embodiment, the base comprises an opening having a width that is equal to or greater than the distance between the first TEC and the second TEC. In one embodiment, the opening is configured to permit the passage of a light beam path through a section of the one or more sample holders bridging the distance between the first TEC and the second TEC, wherein the light beam path is capturable by a microscope objective configured for a microscopy technology selected from the group consisting of: light field microscopy, dark field microscopy, fluorescence microscopy, raman microscopy, polarized light microscopy, phase-contrast microscopy, differential interference contrast microscopy, and multiphoton excitation microscopy. In one embodiment, the lid that is at least partially transparent.

In one embodiment, the chamber comprises at least one gas inlet and at least one gas outlet. In one embodiment, the at least one gas inlet is connected to a source of dry gas. In one embodiment, the chamber comprises at least one sensor selected from: a humidity sensor, a tilt sensor, and a temperature sensor. In one embodiment, the one or more sample holders are selected from the group consisting of: sample channels, sample capillaries, and sample well arrays.

In one embodiment, the lid has an underside having a sample holder mount and a flexible tube section attached such that the flexible tube section surrounds the sample holder mount. In one embodiment, the one or more sample holders are attachable to the sample holder mount such that the one or more sample holders are suspended under the lid. In one embodiment, the lid can be pressed onto the chamber to compress the flexible tube section such that attached sample holders are lowered to simultaneously touch the first end of each of the sample holders to the first TEC and the opposing second end of each of the sample holders to the second TEC.

In one embodiment, the lid has an underside having at least one induction coiled attached, each induction coil being electrically connected to a respective electrode port mounted on a topside of the lid. In one embodiment, the one or more sample holders are magnetically attachable to the induction coils such that the one or more sample holders are suspended under the lid. In one embodiment, the lid can be placed on the chamber and the one or more sample holders are releasable from the induction coils to simultaneously touch the first end of each of the sample holders to the first TEC and the opposing second end of each of the sample holders to the second TEC.

In another aspect, the present invention provides a method of probing phase transition behaviors of one or more samples, comprising the steps of: providing the device of the present invention; loading the one or more samples into the one or more sample holders; selecting an interior condition of the chamber; setting a temperature for the first TEC and the second TEC; placing the one or more sample holders on the first and second TEC to simultaneously touch the first end of each of the sample holders to the first TEC and the opposing second end of each of the sample holders to the second TEC; and imaging the one or more sample holders.

In one embodiment, the method further comprises a step of horizontally leveling the device. In one embodiment, the interior condition of the chamber is selected for a percent humidity and a temperature. In one embodiment, the imaging step is performed using a microscopy technology selected from the group consisting of: light field microscopy, dark field microscopy, fluorescence microscopy, raman microscopy, polarized light microscopy, phase-contrast microscopy, differential interference contrast microscopy, and multiphoton excitation microscopy.

BRIEF DESCRIPTION OF THE DRAWINGS

The following detailed description of exemplary embodiments of the invention will be better understood when read in conjunction with the appended drawings. It should be understood, however, that the invention is not limited to the precise arrangements and instrumentalities of the embodiments shown in the drawings.

FIG. 2A depicts a dark field image of an exemplary six-channel linear temperature gradient device. FIG. 2B depicts temperature vs. scattering intensity inside the marked channel in FIG. 2A (second from the top).

FIG. 3A depicts an exploded view of an exemplary microfluidic device suitable for two variable analysis. FIG. 3B depicts an enlarged, top-down view of the mixing and loading regions of the device of FIG. 3A.

FIG. 5A depicts an enlarged view of one embodiment of the temperature gradient microfluidic device. FIG. 5B depicts an enlarged, isolated view of the geometry of the channels in the microfluidic device of the FIG. 5A. FIG. 5C depicts a variety of sample chip designs, including (A) silica, (B) PDMS chemical structures, (C) channel layouts, (D) well layouts, (E) sample loading by injection, and (F) sample sealing by cover seal.

FIG. 12A depicts a sample chamber detached for sample loading. FIG. 12B depicts the sample chamber installed for temperature gradient measurement preparation. FIG. 12C depicts the sample chip released from the sample chamber to initiate an experiment.

FIG. 14A depicts a dark-field image of a poly N-isopropyl acrylamide (PNIPAM) sample on a temperature gradient instrument. FIG. 14B depicts a line scan of the bordered region in FIG. 14A. The onset of the lower critical solution temperature (LCST) is shown in FIG. 14A by the top arrow and in FIG. 14B by the dashed line. The solid lines in FIG. 14B are linear fits to data showing onset of phase transition.

DETAILED DESCRIPTION

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Temperature Gradient Device

Figure 1A:
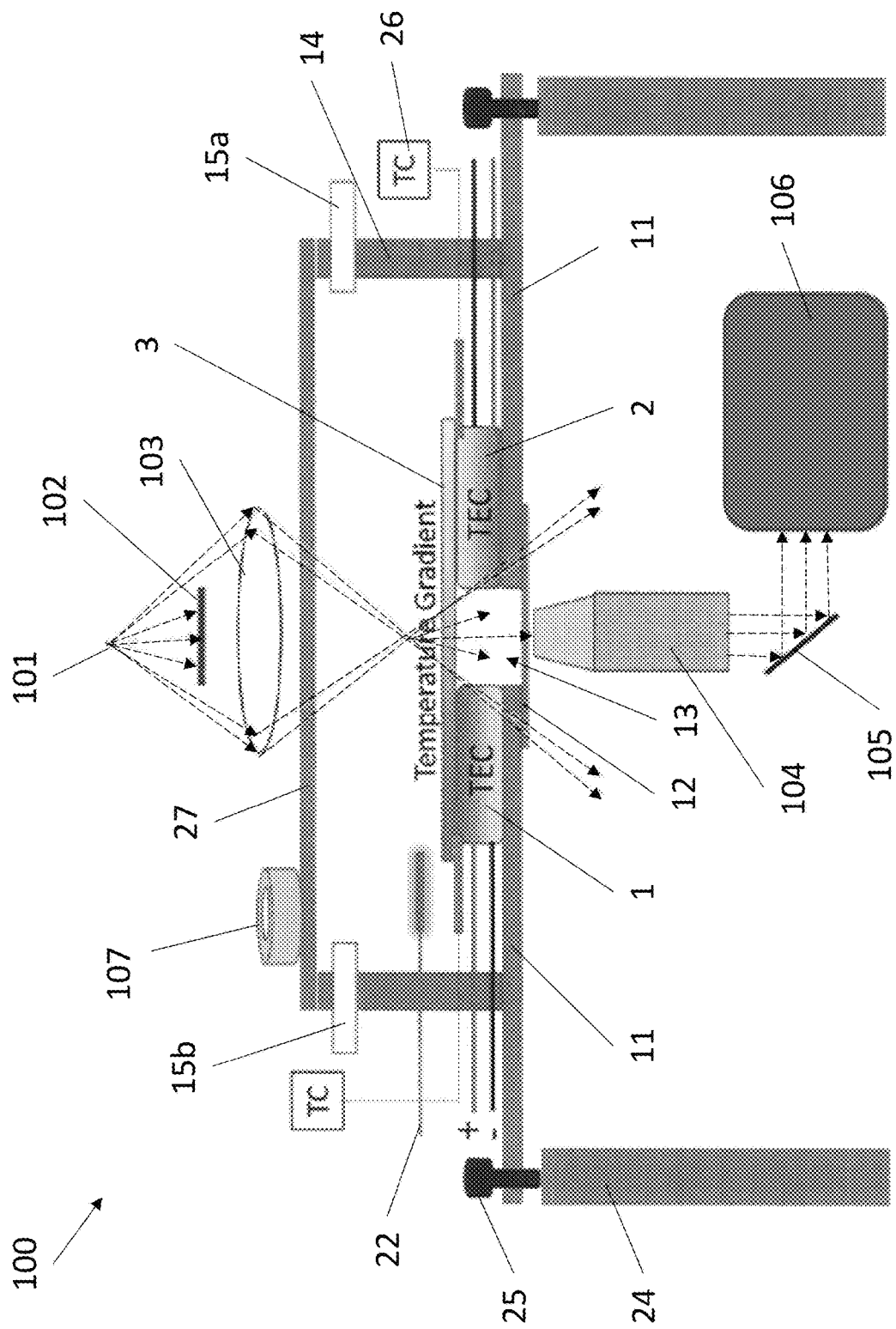
FIG. 1A depicts an exemplary temperature gradient device for measuring phase transitions with an inverted microscope.
Figure 1B:
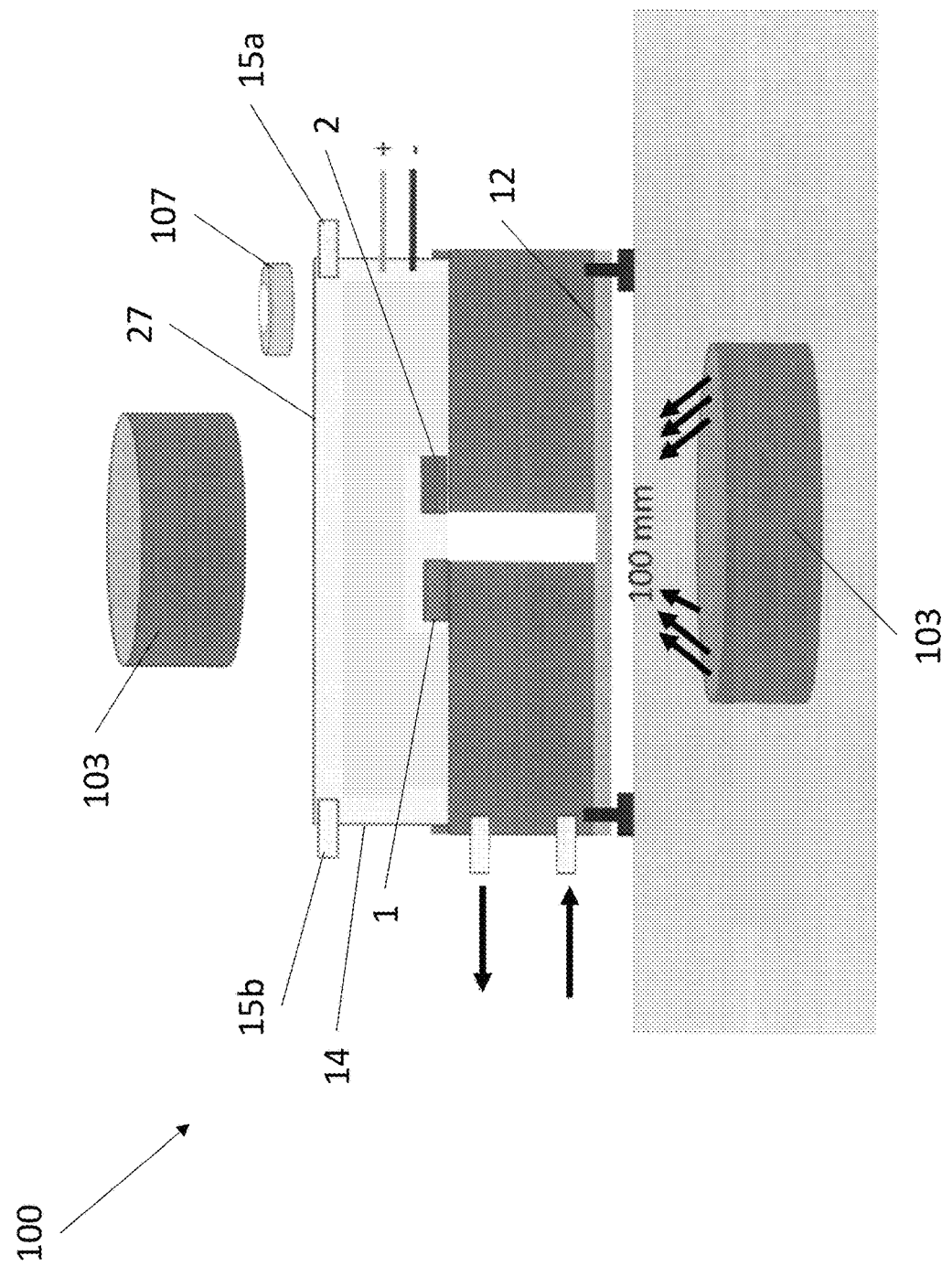
FIG. 1B depicts an exemplary temperature gradient device for measuring phase transitions with an upright microscope.

In a first aspect, the present invention is an apparatus for providing a linear temperature gradient to a substrate wherein the substrate comprises an architecture suitable for massively parallel chemical or biochemical processing. The apparatus comprises a first and second temperature element disposed essentially parallel to each other and in thermal contact with the substrate. FIG. 1A and FIG. 1B depict exemplary temperature gradient systems and devices of the present invention.

Referring now to FIG. 1A through FIG. 1D, the temperature gradient system 100 comprises a temperature gradient device having temperature elements 1 and 2 on a main support body having base/heat sink 11, spring 24, and adjusting screw 25.; a microfluidic apparatus comprising substrate 3 with a plurality of channels 4; a climate control system comprising a sealable chamber 14, lid 27, gas inlet valve 15a, relief/outlet valve 15b, humidity sensor 22, temperature sensor or thermocouple 26, tilt sensor 107; and an optical and detection apparatus comprising light source 101, lens 102, darkfield condenser 103, objective lens 104, mirror 105, and charge coupled device 106.

Temperature Elements

As described above, an exemplary embodiment of the present invention is shown in FIG. 1A and FIG. 1B and comprises a first and second temperature elements 1 and 2 mounted on a base/heat sink 11 and a substrate 3 that can be brought in thermal contact with temperature elements 1 and 2. Temperature elements 1 and 2 may include any type of electrical heating element, such as a heating cartridge, a resistively heated wire or filament, heating tape (e.g., NiCr tape), or a thermoelectric module (e.g., Peltier device).

In some embodiments, temperature elements 1 and 2 are thermoelectric coolers (TECs). A typical single stage TEC may include two ceramic plates with "elements" of p-type and n-type semiconductor materials (e.g., bismuth telluride alloys) between the plates. The elements of semiconductor materials are connected electrically in series and thermally in parallel. When a positive DC voltage is applied, electrons pass from the p-type to the n-type element, and the cold-side temperature decreases as the electron current absorbs heat, until equilibrium is reached. Heat absorption (cooling) is proportional to the current and the number of thermoelectric couples. This heat is transferred to the hot side of the cooler, where it is dissipated into a heat sink and/or surrounding environment. These TEC devices use the Peltier effect to create a heat flux between the junctions of two different types of materials. When activated, heat is transferred from one side of the TEC to the other such that a first side/surface of the TEC becomes cold while a second side/surface becomes hot (or vice versa).

In one embodiment, at least one of the temperature elements have opposing faces. The first face thereof facing towards sealable chamber 14 as depicted in FIG. 1A, and being thermally communicable with substrate 3, to provide either heat or cooling to substrate 3. The temperature at the surface of the first face can be controlled using any type of computing device. The second face thereof is in thermal communication with base/heat sink 11 for either receiving heat from or releasing heat to base/heat sink 11.

One of skill in the art will appreciate that some devices such as the thermoelectric module may operate more effectively where it can rapidly establish a steady state gradient (within seconds) compared to a conduit type temperature element where the temperature elements can be controlled by controlling the temperature of a fluid, for example by using a circulating/cooling bath. In the latter case, it can take about an hour for the gradient to reach a steady state.

Figure 6:
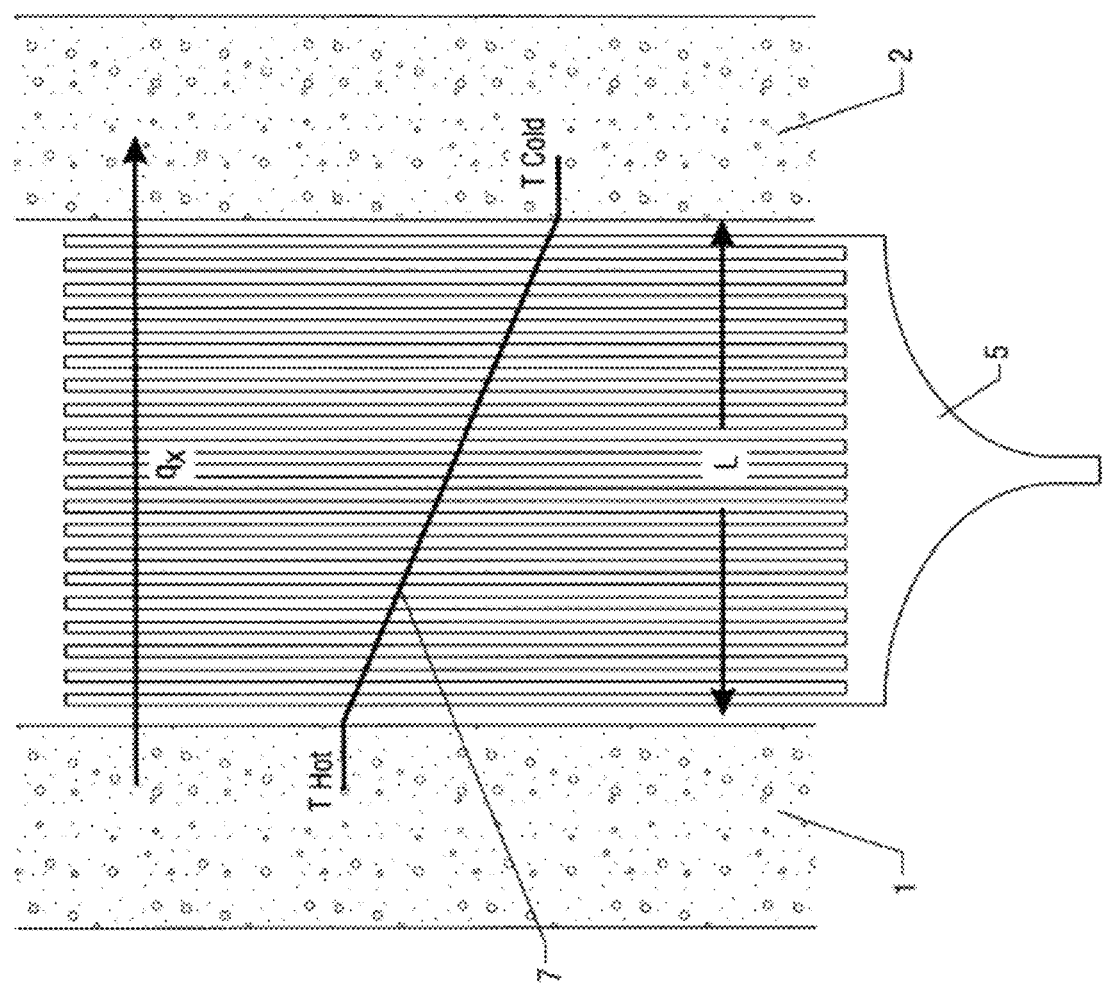
FIG. 6 depicts a schematic representation of an exemplary linear temperature gradient formed in the microfluidic device of FIG. 5.

When differing temperatures are applied to temperature elements 1 and 2, for example a high temperature to temperature element 1 and a lower temperature to temperature element 2, a temperature gradient is formed between the elements. Such a temperature gradient 7 is depicted schematically in FIG. 6. The direction of heat flow is denoted by $q_x$. When heat flow is restricted to one direction along a two-dimensional planar surface, heat flow is governed by the Fourier heat diffusion equation (1):

$$\frac{d}{dx}\left(k\frac{dT}{dx}\right) = 0 \quad (1)$$

where T is temperature, x is the position along the direction of heat transfer, and k is the thermal conductivity of the medium in which the heat is flowing. If a hot reservoir and a cold sink are separated by a straight wall of thickness L within the plane, equation (1) can be doubly integrated to yield equation (2), which describes how the temperature inside the wall varies linearly between the two interfaces.

$$T(X) = T_{cold} + (T_{hot} - T_{cold}) \times x/L \quad (2)$$

In equation (2), $T_{cold}$ is the temperature of the cold interface and $T_{hot}$ is the temperature of the hot interface. When the distance between the temperature elements is too great, the linearity of the temperature gradient suffers. It is difficult to take advantage of equation (2) in macroscopic situations, but in the methods and devices of the present invention heat exchange in the third dimension is essentially negligible over the length-scales involved and linear temperature gradients can be achieved.

The distance between the temperature elements can vary according to the size of the apparatus and the number of channels, but the distance should not be great enough to severely diminish the linearity of the temperature gradient, i.e., the distance should be such that equation (2) remains linear. The distance between the temperature elements is typically below about 10 cm and more typically below about 1 cm. According to one embodiment, the distance between the temperature elements is between about 10 to about 15.0 mm. According to another embodiment, the distance is between about 1.7 mm to about 2.3 mm. Shorter distances permit a temperature gradient to be established in a shorter period of time, while longer distances facilitate the measurement of phase changes as a temperature gradient is established over a longer period of time. In certain embodiments, the distance between the temperature elements 1 and 2 is adjustable, such as by each temperature element 1 and 2 being mounted on a movable platform or slidable along a rail.

In one embodiment, base/heat sink 11 is made with a hole 13 in its center. In one embodiment, this hole 13 is sealed with a thin coverslip 12 to serve as a window for imaging. In one embodiment, base/heat sink 11 can be made of any material with sufficient thermal conductivity, such as aluminum. In another embodiment, the hot side of base/heat sink 11 is attached to either water/coolant circulation or a small CPU fan to take the extra heat away and reach a lower temperature at the cold side of the thermoelectric coolers.

Microfluidic Apparatus

The apparatus further comprises substrate 3 that can be brought in thermal contact with temperature elements 1 and 2. In some embodiments, substrate 3 is a disposable microfluidic sample chip. Substrate 3 can be made of any material with sufficient thermal conductivity that is chemically compatible with its intended purpose. Particularly suitable materials for substrate 3 include glass, poly(dimethyl siloxane) (PDMS), and silicone. Thermal contact between temperature elements 1 and 2 and substrate 3 can be provided by direct physical contact or may be enhanced by an intervening thermally conductive material. Examples of suitable thermally conductive materials include oil, grease, water, thermal paste, and the like.

In various embodiment, the architectures of the present invention typically comprise some means of containing fluid samples, e.g., wells, reservoirs, or channels. The volume of fluid contained in each well or channel is typically less than about 1 mL and more typically between about 10 μL and about 0.1 mL. Even smaller sample volumes (on the order of femtoliter-nanoliters) can be manipulated with embodiments of the present invention utilizing microfluidics. Small sample sizes have correspondingly low heat capacities. This is important in the present invention because it allows thermal equilibrium to be reached very quickly, e.g., as fast as $10^{7\circ}$ C./s. As the volume of fluid increases, the heat capacity of the system also increases and thermal equilibrium is not reached as quickly. If the heat capacity becomes too great, heat flow in the third dimension will no longer be negligible, i.e., the assumptions contained in Equations (1) and (2) will no longer hold and linear temperature gradients will not be obtained.

Figures 3A, 3B:
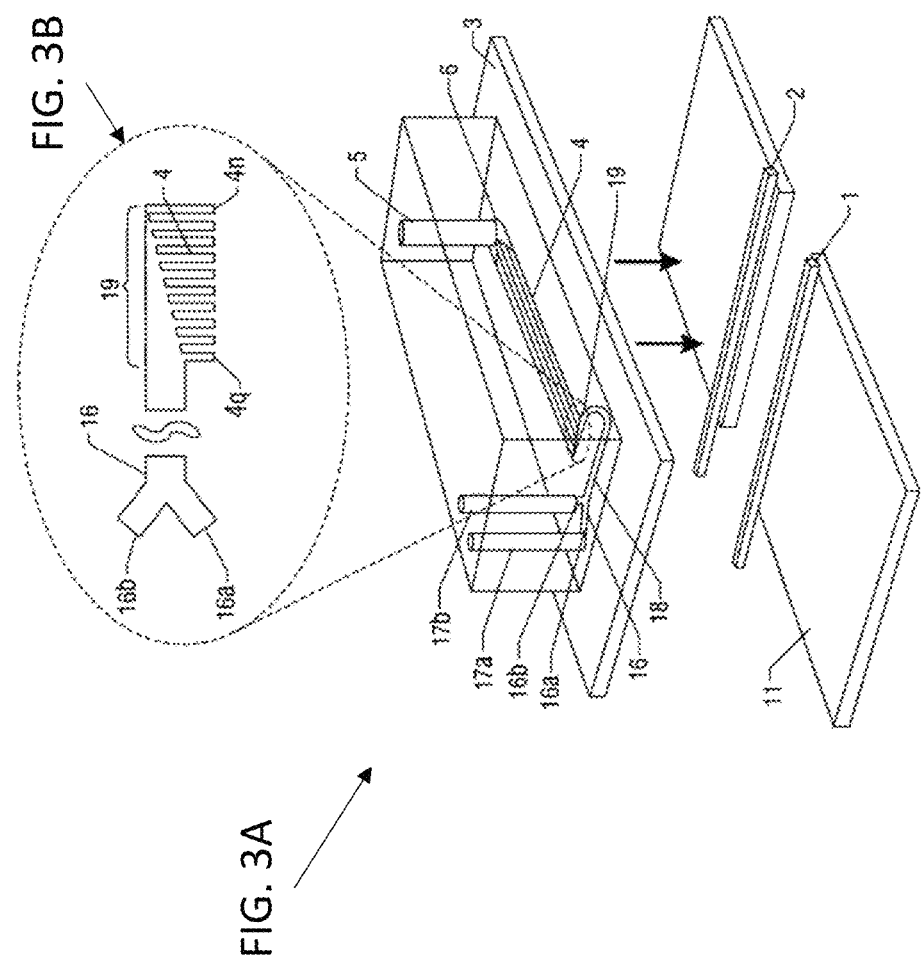
FIG. 3A and FIG. 3B depict a schematic of an exemplary temperature gradient microfluidic device for two variable analysis.

In some embodiments, substrate 3 comprises a plurality of channels 4 disposed on substrate 3, such as in FIG. 3A. The channel architecture refers to any of the various architecture known in the art that is suitable for massively parallel chemical or biochemical processing for manipulating very small volumes of fluid samples in a highly parallel fashion. Channel-based chips offer continuous temperature resolution, where phenomena such as liquid-liquid phase separation can be monitored across an entire range of a temperature gradient simultaneously. According to one embodiment, channels 4 can be etched into substrate 3. Channels 4 can be made using any available fabrication techniques, including lithographic techniques such as photolithography and soft lithography.

In some embodiments, substrate 3 comprises capillary arrays. The capillary arrays can comprise a plurality of capillary tubes, each capillary tube having a thin elongate construction and is loadable with a fluid sample and sealable to hold the fluid sample within.

Figure 5A:
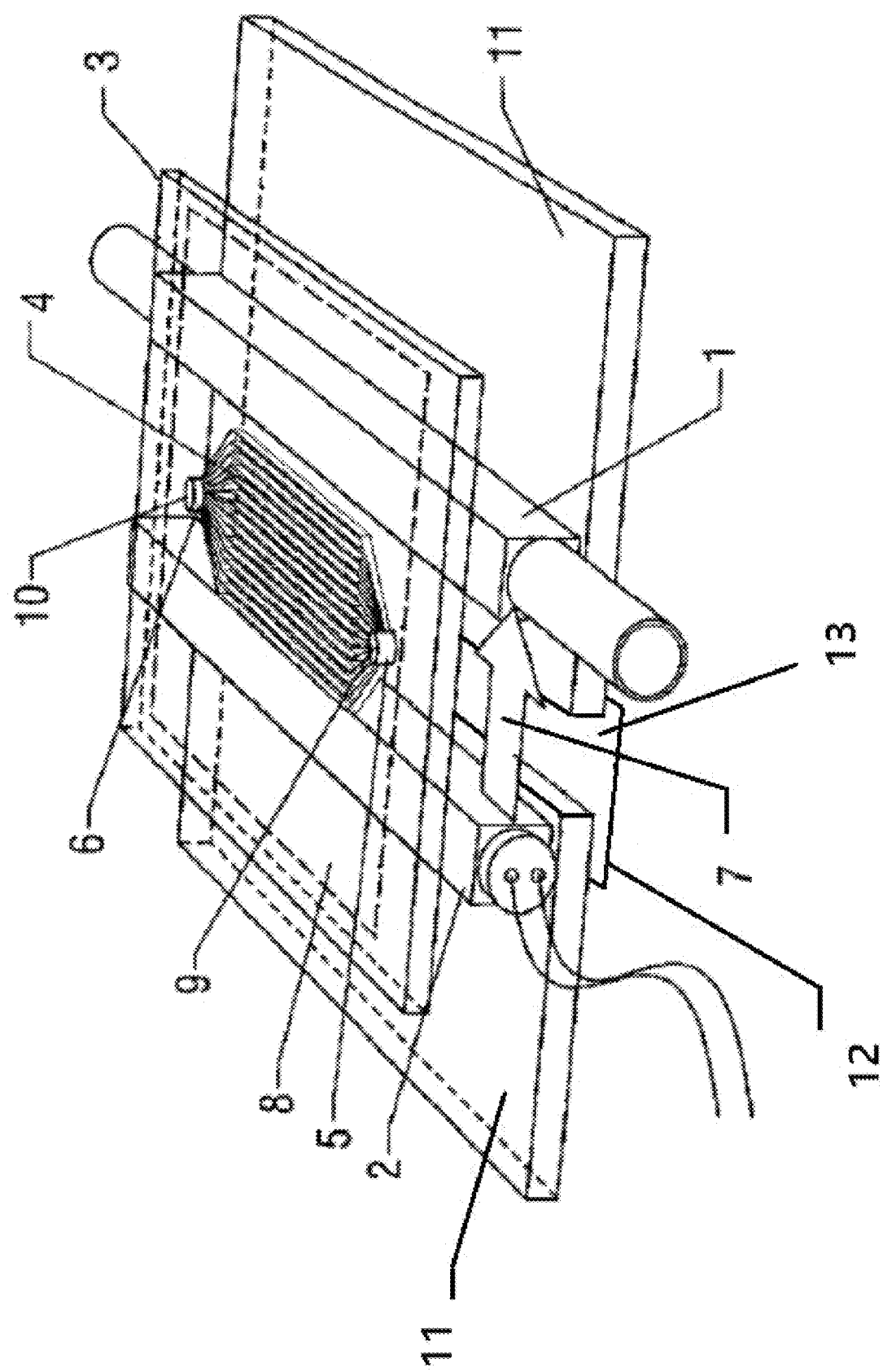
FIG. 5A through FIG. 5C depict schematic of exemplary temperature gradient microfluidic devices.
Figure 5B:
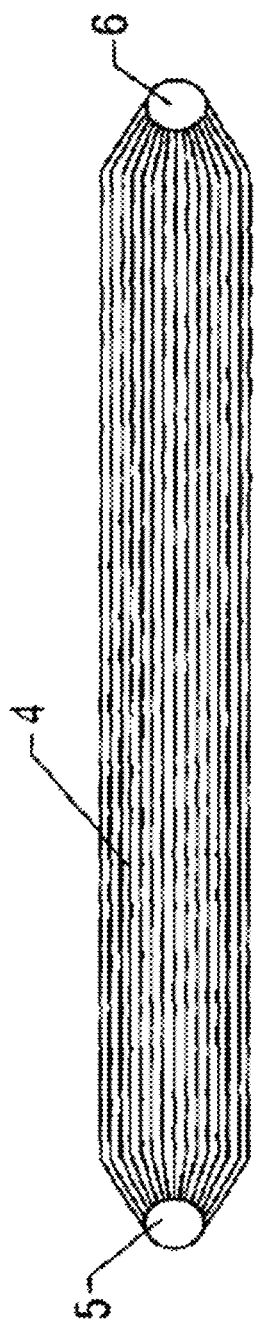
Figure 5C:
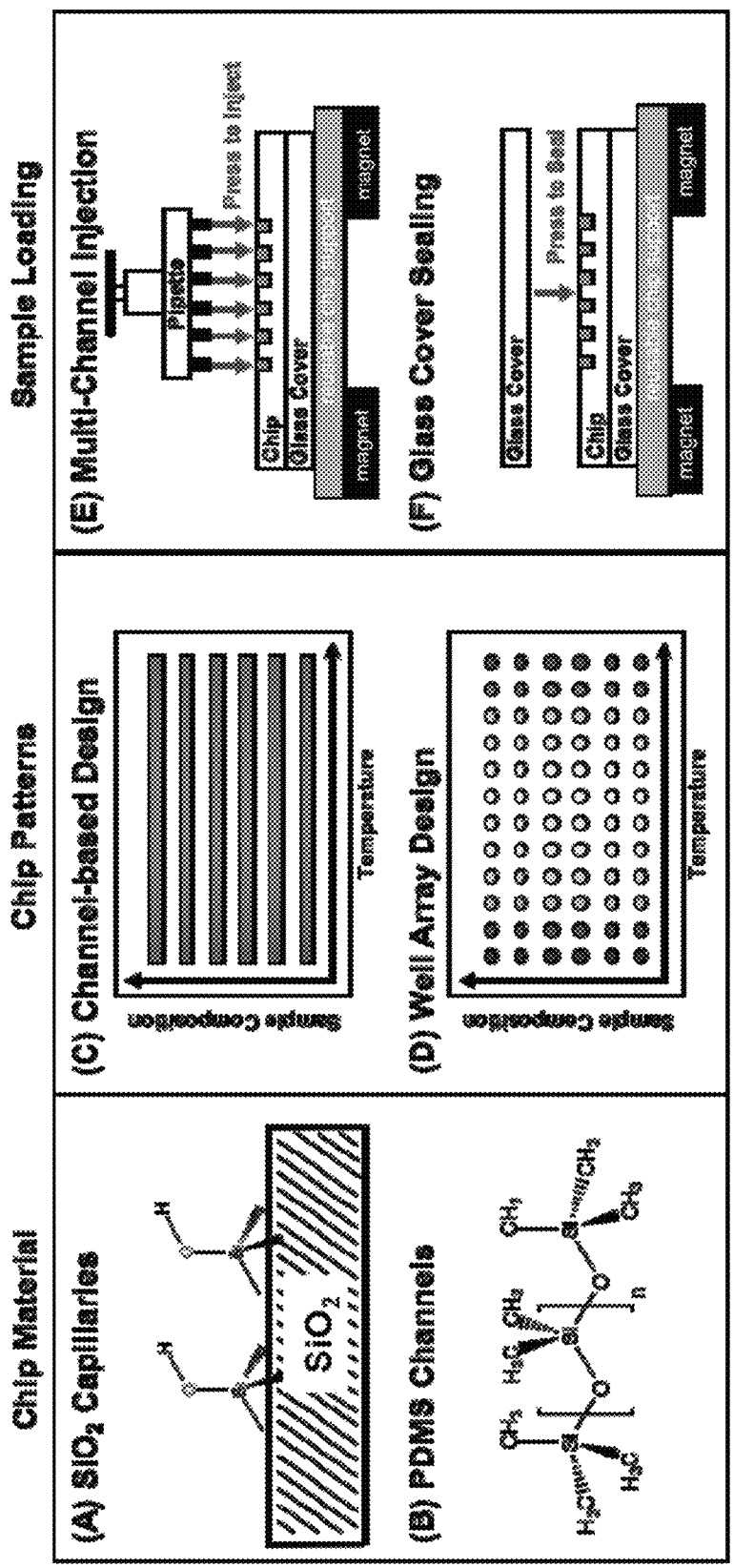

In some embodiments, substrate 3 comprises an array of wells, e.g., 96, 384, 1536, 6144 wells (FIG. 5C (D)). Well arrays can help avoid thermophoresis, the migration of chemicals along a temperature gradient. These arrays are employed in combinatorial methods and are typically addressed using robotics. Well arrays can be loaded manually using multi-channel pipettes or using an automated loading system and sealed using a coverslip or glass cover.

In some embodiments, substrate 3 comprises comprise combinations of channels 4 and reservoirs. Samples can be typically manipulated in these devices using pressure or electrophoretic methods as describe in U.S. Pat. No. 5,904,824, the entire contents of which are incorporated herein by reference.

In certain embodiments, adsorption prevention agents can be used to reduce unwanted adsorption by treating a surface of substrate 3 with one or more coatings comprising, e.g., detergents (ionic or nonionic) and blocking agents (e.g., high molecular weight polymers such as polyethylene glycols, polyethers, and the like), or alternatively proteins such as caseins, albumins (e.g., BSA and the like), high ionic strength or high concentrations of zwitterionic compounds such as betaine, and nonaqueous solvents, such as ethanol, methanol, dimethlysulfoxide (DMSO) or dimethylformamide (DMF) and the like.

In some embodiments, shown in FIG. 2A, channels 4 are laid across the first and second temperature elements 1 and 2 such that a first end of each channel 4 is in contact with the first temperature element 1 and an opposing second end of each channel 4 is in contact with the second temperature element 2. In this embodiment, each channel 4 is parallel to a temperature gradient formed between temperature elements 1 and 2.

In some embodiments, channels 4 are disposed essentially parallel to each other. The length of the channels 4 can vary depending on the application but is typically between about 1 mm to about 40 mm, more typically between about 8 mm to about 24 mm. Channels 4 typically have at least one cross sectional dimension (width of the channel 4) that is between about 10 to about 200 μm, more typically between about 10 to about 50 μm. The space between channels 4 can vary depending on the application but is typically between about 10 to about 200 μm, more typically between about 50 to about 150 μm. The height of the channels 4 can vary depending on the application and can be in a range of between about 10 μm to 1 mm.

FIG. 3A and FIG. 3B show a still further embodiment of the apparatus, wherein a plurality of channels 4, comprising channel 4a through channel 4n, are perpendicular to temperature elements 1 and 2 and therefore parallel with the temperature gradient. The apparatus of FIG. 3A also comprises a means of mixing or diluting analytes as they are applied to the plurality of channels 4. Two streams of liquid merge at a Y-junction 16, shown in expanded view in FIG. 3B. Referring back to FIG. 3A, inlets 17a and 17b provide the streams to the Y-junction 16 as they are applied to the plurality of channels 16, comprising channels 16a and 16b, where they merge and diffuse into each other as they flow downstream side by side through mixing region 18. Ideally, only diffusional mixing occurs because the Reynolds number inside mixing region 18 is low enough to prevent turbulence. The length of mixing region 18 can vary but is typically between about 0.2 to about 4 cm. The greater the distance the liquids flow together, the more they are allowed to mix. The liquids then flow to loading region 19 where they are loaded into channels 4 as a function of distance. Because only diffusional mixing occurs, the streams will vary in composition from channel 4a to 4n. For example, if a component A is provided to channel 16a and a component B is provided to channel 16b, then the composition in channel 4a will be greater in component A because it does not have as much of a chance to mix with component B as analyte that proceeds further through loading region 19.

The embodiment depicted in FIG. 3A and FIG. 3B is a multidimensional assay because it allows the effect of temperature to be interrogated along one dimension of the apparatus and the effect of composition to be interrogated along a second dimension. Variables such as analyte concentration, pH, and buffer concentration can be varied from channel to channel and each probed simultaneously at different temperatures. For example, analyte concentration can be varied from channel to channel by providing a solution of analyte to channel 16a and buffer or solvent to channel 16b.

Figure 4:
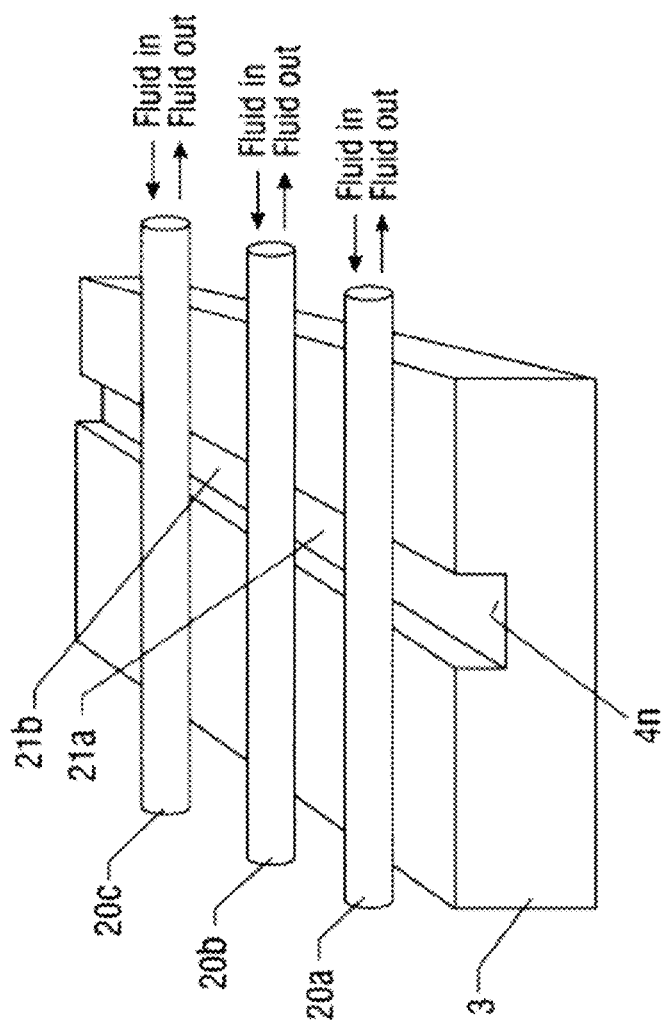
FIG. 4 depicts a schematic of an exemplary system of elastomeric, fluid-actuated valves for partitioning a microfluidic channel.

According to another embodiment of the present invention depicted in FIG. 4, the apparatus comprises channels 4 that can be partitioned and into reservoirs that are hermetically sealed from each other. Several techniques exist in the art for partitioning microfluidic channels. For example, elastomeric, fluid-actuated valves are described in U.S. Pat. No. 6,408,878, the entire contents of which are incorporated herein by reference. FIG. 4 schematically depicts a representative channel 4n disposed on substrate 3. Elastomeric tubes 20a, 20b, and 20c are disposed across channel 4n. In the "open" state, tubes 20a, 20b, and 20c are essentially evacuated and analyte can flow freely through channel 4n. The valves are actuated, i.e., "closed," by charging tubes 20a, 20b, and 20c, with sufficient fluid that they expand to block channel 4n effectively isolating compartments 21a and 21b from each other. Because the analyte in channel 4n is somewhat inelastic, it may be necessary to actuate the valves sequentially, i.e., 20a followed by 20b followed by 20c, so that the analyte stream has the chance to equilibrate in response to increase in pressure due to the closing of the valves.

Multidimensional arrays having either actuated wells according to FIG. 4 or permanent wells are particularly valuable for studying protein crystallization. The crystallization of proteins is influenced by numerous factors including temperature, pH, protein concentration, and crystallization agent concentration. Also, the presence and concentration of impurities or contaminants can affect crystallization.

In another embodiment shown in FIG. 5A, the channels 4 are disposed parallel to temperature elements 1 and 2. The temperature gradient 7 is therefore perpendicular to channels 4. Each channel 4 is at a unique position along the gradient and therefore at a slightly different temperature than the other channels 4. It should be noted that temperature gradient 7 is depicted schematically as extending between temperature elements 1 and 2 through space in FIG. 5A. This is for clarity only; in reality, heat flow occurs through substrate 3, between the areas of contact of substrate 3 with temperature elements 1 and 2.

In the embodiment shown in FIG. 5A, the apparatus can further comprise a cover 8 disposed on substrate 3. According to one embodiment, channels 4 are open at their tops, and cover 8 serves to seal off the plurality of channels 4. Cover 8 can be made of any material that is chemically compatible with the intended use of the apparatus. Examples of suitable cover materials include glass, PDMS, and silicone. According to one embodiment, cover 8 is optically transparent, thereby allowing optical or spectroscopic access to the channels. Cover 8 can comprise inlet 9 and outlet 10 ports fluidly connected to the plurality of channels 4 to provide analyte to and from channels 4. In one embodiment, such as in FIG. 5B, channels 4 emanate from a common origin 5 and terminate at a common terminus 6. This provides a convenient means of providing and removing analyte to all of the channels simultaneously.

Climate Control System

In one aspect, the present invention further provides a system for controlling air flow, air temperature, and air humidity within chamber 14. Shielding the apparatuses from variations in air flow, temperature, and humidity protects the generated temperature gradients from being disturbed. As described elsewhere herein, the climate control system comprises a sealable chamber 14 and lid 27 positioned on the base/heat sink 11. Chamber 14 has at least one inlet valve 15a and at least one relief/outlet valve 15b fluidly connected to its interior. This system further comprises at least one humidity sensor 22 and at least one temperature sensor 26 positioned within chamber 14.

In one embodiment, the climate control system provides a desired temperature level for chamber 14. The temperature level can be monitored using the at least one temperature sensor 26. In some embodiments, the temperature within chamber 14 can be modified by exchanging ambient gas within chamber 14 with a gas having a desired temperature. In some embodiments, the temperature within chamber 14 can be modified by providing a temperature modulating system to base/heat sink 11. Exemplary temperature modulating systems include but are not limited to fans and liquid loops (FIG. 1D). The temperature modulating system can remove excess heat using a fan or use a heated or cooled liquid to increase or decrease the temperature within chamber 14 as needed.

In one embodiment, the climate control system provides a desired humidity level for chamber 14 by sensing the actual humidity level within chamber 14 using humidity sensor 22. This feature is required based at least in part on whether an increase or decrease in humidity within chamber 14 is required and based at least in part on comparison of the desired and actual levels. If the humidity level needs to be decreased, performing a dry purge process; thereby causing any condensation to selectively occur on the cold side of the device as opposed to the chamber. In one embodiment, the dry purging system may provide, for example, means for dispensing nitrogen or argon gas from a nitrogen/argon source via an inlet valve (15a) as shown in FIG. 1A, FIG. 1B, and FIG. 1D into chamber 14, such as by a pressurized tank or container.

It should be appreciated that when purging, a means for maintaining the desired pressure level in chamber 14 may be required, so as to preclude over-pressurization. For example, where chamber 14 is substantially sealed with lid 27, a relief/outlet valve (15b) can be used to ensure no unwanted pressurization of the system components.

In another embodiment, purging can be accomplished by simply evacuating chamber 14 of humid air. For example, a pump (such as a linear pump, not pictured) can be used to simply draw higher-humidity air out of the chamber in favor of a lower-humidity replacement. Such replacement gas may simply be the existing ambient air exterior to chamber 14. An alternative solution is to supply a purge gas (e.g., nitrogen, argon) into chamber 14 as previously described while simultaneously evacuating the moisture-laden air from chamber 14 using a pump.

While the foregoing means for removing humidity from a gas (e.g., air) are well known in the art, one other exemplary method for doing so is by pumping a gas stream through a container filled with a desiccant, such as for example Drierite™. In one exemplary embodiment, when it is desired to decrease the humidity within the closed portion of the system, the gas flow can be diverted through a desiccant container. The desiccant is useful in absorbing moisture out of gas and subsequently lowering the relative humidity of gas circulating to chamber 14. If a desiccant such as Drierite™ is used, the desiccant can be loaded into a clear polycarbonate container so that it can be readily apparent when the moisture absorbing ability of the desiccant (i.e., by a color change in the material) has been exhausted, thereby visually signaling that the desiccant needs to be replaced.

In another embodiment, it may not be necessary to replace the desiccant but rather it may be recharged by heating the desiccant (such as by direct heating, or loading it into an oven or other source of heat) to evaporate the moisture from the desiccant.

In another embodiment, a moisture separator apparatus such as that used in steam systems may be employed to separate moisture from a carrier gas. For example, well known centrifugal moisture separators comprise a comparatively high-velocity gas flow path which causes the gas to rapidly change direction (accelerate). Such acceleration induces the heavier water entrained within the gas to be separated from the lighter gas, and collect on nearby structures (such as fins or flow channels disposed in the gas/moisture path). The separated moisture can then be collected, such as via a simple drip system. A myriad of different configurations of moisture separators are known to those of ordinary skill, and hence not described further herein.

The importance of controllable temperature element(s) also relates in part to the fact that moisture absorption and humidity level has a direct relationship with ambient air temperature. As a general rule, the higher the temperature of the air, the more moisture that can be held as water vapor within the air, and conversely the cooler the air, the less moisture that can be held as gaseous water vapor. This characteristic can be observed with natural phenomena such as fog. Fog is formed when a warmer body of air containing water vapor cools below its "dew point". At this cooler temperature, the air can no longer support the level of water vapor contained within it and this water vapor condenses into a liquid form (visible fog). By controlling the temperature and humidity in the testing chamber, condensation that would otherwise occur inside of the chamber can be minimized and even eliminated completely, occurring alternatively within the chamber.

Once the desired humidity level is reached within chamber 14, the valves 15b as shown in FIG. 1A and FIG. 1B, can optionally be closed to minimize the transfer of humidity by natural convection or other means. This process can be automated if desired, such as via a control signal generated by way of a chamber humidity sensor 22 that actuates one or more solenoid operated valves. As an alternative, the system may continue to function with the linear compressor continuing to pump air into chamber 14, with the humidity being maintained at the desired level by controlling pump motor speed in response to humidity sensors 22 installed within various points of the system.

Optical and Detection Apparatus

Referring to FIG. 1A and FIG. 1B, an example system 100 configuration with a microfluidics optical device and detection apparatus in accordance with embodiments of the present invention is shown. As described elsewhere herein, in one aspect, the optical and detection apparatus comprises a light source 101, an optical lens 102, a darkfield condenser 103, an objective lens 104, a mirror 105 and a charge coupled device (CCD).

Light source 101 may provide a beam of light that then can pass via lens 102, through a darkfield condenser 103, to microfluidic optical chamber via an optically transparent opening. Light source 101 can provide an illumination/excitation light beam that may be any suitable form of light, such as white light, laser light (e.g., visible laser, ultraviolet (UV) laser, near infrared laser etc.), light emitting diode (LED), super luminescent diode, polarized light, halogen lamp-generated light, continuous or pulsed Xenon Lamp, Mercury light source, Argon light source, Deuterium light source, Tungsten light source and Deuterium-Tungsten-Halogen mixed light source, etc.

Once the beam of light is passed through chamber 14, absorbance can occur via objective lens 104, with reflection off mirror 105 and through a beam splitter. Also, fluorescence can emanate from chamber14 and may be received via an optical lens and passed to a beam splitter (not pictured). From the beam splitter, light can be reflected using mirror 105 and received by a spectrograph. The spectrograph may also include a charge coupled device (CCD) 106 for analysis of the various wavelengths contained in the received light beam.

Image spectrometry can be performed using several sources of photons. For example, when used with darkfield condenser 103, scattered photons are collected by objective lens 104, propagate back through the optical path, and are focused onto a slit or pinhole which serves as the entrance aperture of the imaging spectrometer. Light is dispersed by the spectrometer, generally by means of mirror 105, and detected by a backside CCD camera 106, generally a monochrome CCD camera. Additional imaging modalities for hyperspectral imaging are possible on the same microscope, such as bright field, UV and fluorescence imaging, when microscopes are suitably equipped (not shown). The darkfield microscope described can be an inverted microscope as depicted in FIG. 1A or an upright microscope as depicted in FIG. 1B.

It should be understood that the present invention is not limited to the microscopy and imaging technologies described herein. Persons having skill in the art will understand that any suitable microscopy and imaging technologies can be compatible with the elements of the present invention, including but not limited to: fluorescence imaging, raman microscopy, polarized light microscopy, phase-contrast microscopy, differential interference contrast microscopy, multiphoton excitation microscopy, and the like.

Tilt Sensor

In certain embodiments, as depicted in FIG. 1A and FIG. 1B, an apparatus further includes tilt sensor 107 configured to sense a tilt angle of the chamber. Liquid-liquid phase separation (LLPS) formation involves the formation of protein-rich liquid droplets that fall to the bottom of a fluid sample by gravity. As such, the temperature gradient system 100 needs to be leveled to prevent protein rich droplets from rolling toward the hot or cold sides of the fluid sample container of substrate 3. One or more tilt sensors 107 can be placed on top of chamber 14 to detect the level of chamber 14. Temperature gradient system 100 further comprises means of adjusting level such as by providing base/heat sink 11 with at least two supports 24, each support 24 having an adjusting screw 25 mounted in a threaded vertical hole. The position of temperature gradient system 100 can thereby be leveled by turning each of the adjusting screws 25 to prevent gravity from causing any inadvertent flow of fluid or particles within the samples.

Bellows Sample Introduction

Figure 7:
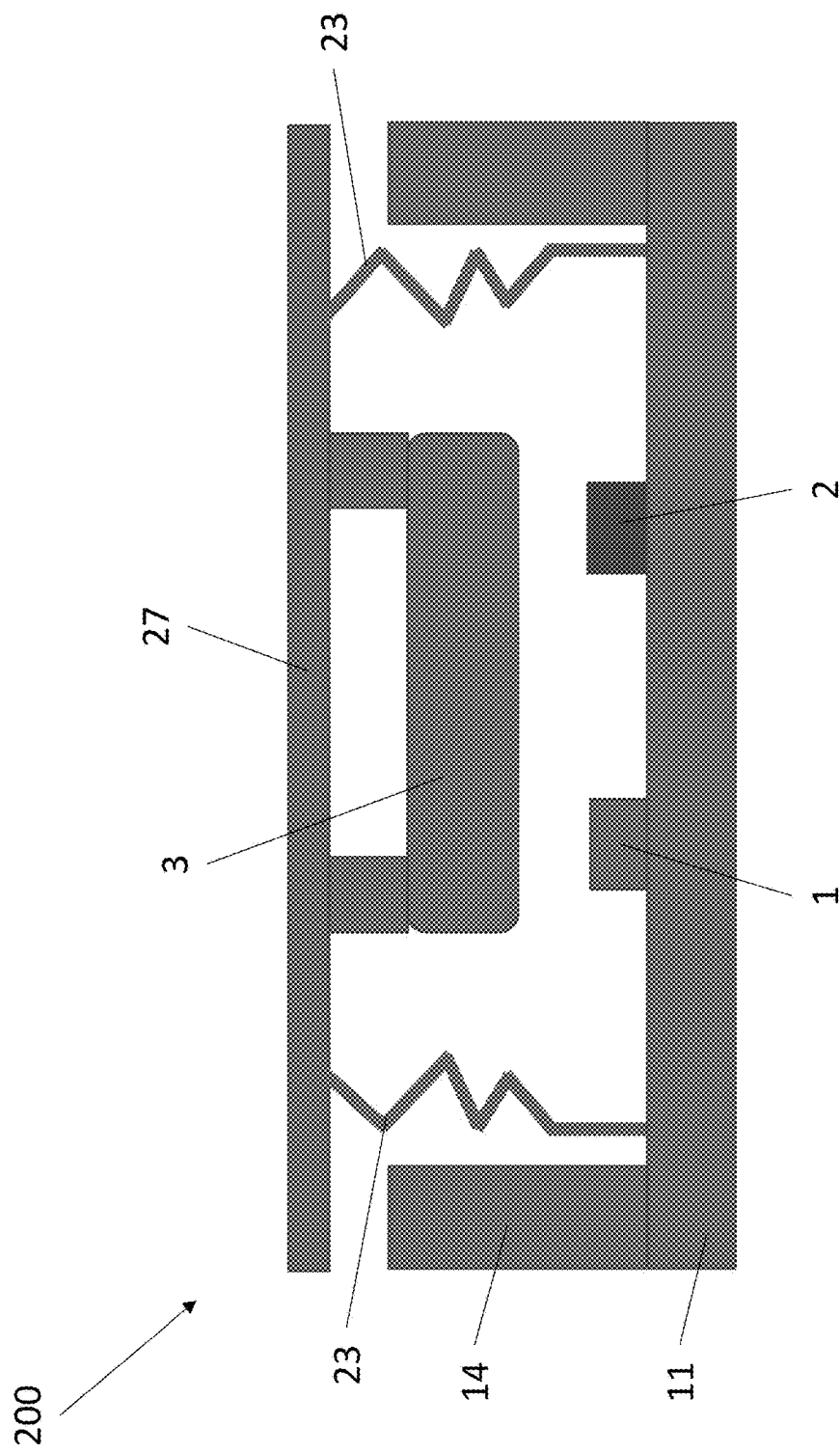
FIG. 7 depicts an exemplary side view schematic of in-chamber sample introduction.

Referring now to FIG. 7, in one exemplary embodiment of this invention, the temperature gradient system may further include a bellows sample introduction unit 200. Bellows sample introduction unit 200 is configured to place a sample on temperature elements 1 and 2 simultaneously and immediately after stabilizing the climate conditions of chamber 14. Bellows sample introduction unit 200 thereby facilitates quick establishment of a temperature gradient across a sample, enabling the measurement and recordation of phase changes at an early time point, such as within the first 10 to 30 seconds of an experiment.

Bellows sample introduction unit 200 comprises a flexible element 23 attached to lid 27 with substrate 3 mounted to the underside of lid 27. Flexible element 23 enables lid 27 to suspend substrate 3 above temperature elements 1 and 2 and to bring substrate 3 in simultaneous contact with temperature elements 1 and 2 by pressing down upon lid 27.

Figure 8A:
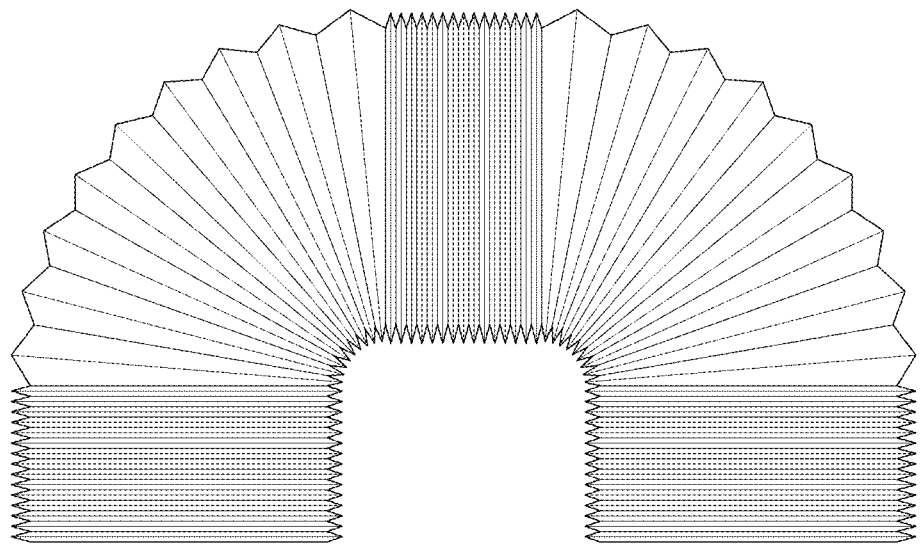
FIG. 8A depicts an exemplary image of a bellows hose used herein as the chamber walls.
Figure 8B:
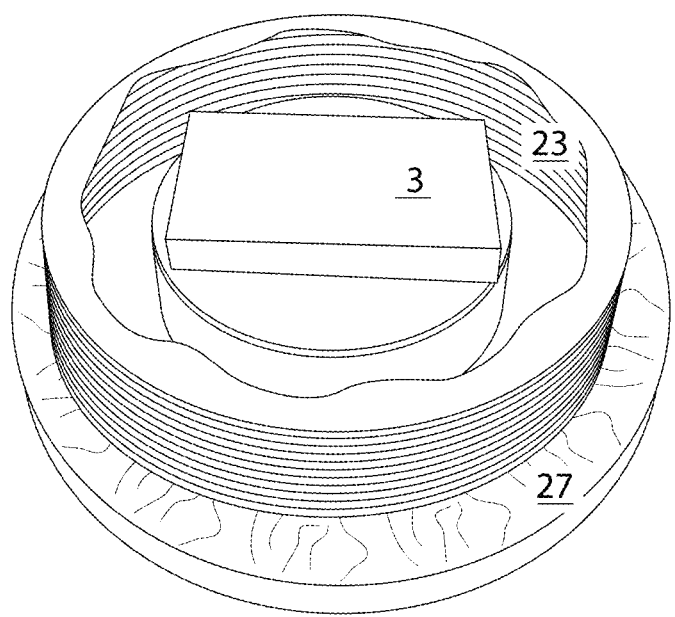
FIG. 8B depicts a bottom-up view of a chamber with a substrate component.
Figure 9A:
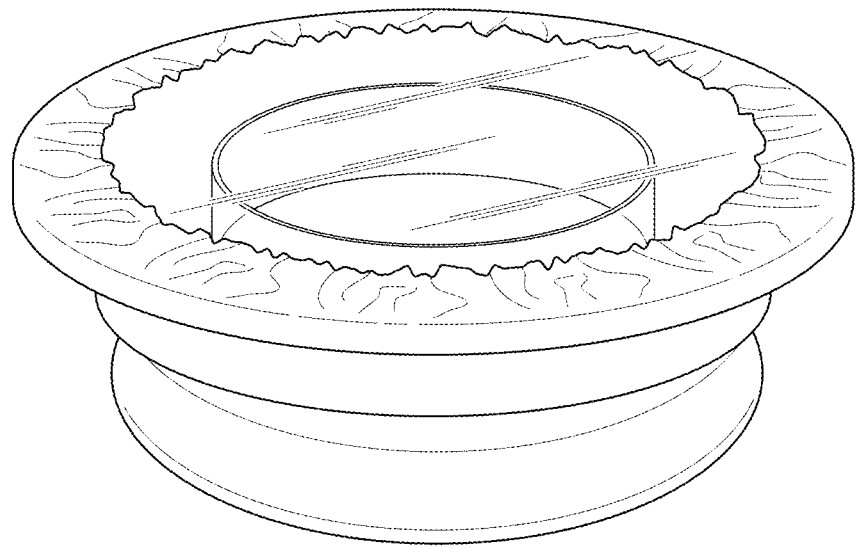
FIG. 9A and FIG. 9B depict images of the extended bellows (FIG. 9A) and the pressed bellows (FIG. 9B).
Figure 9B:
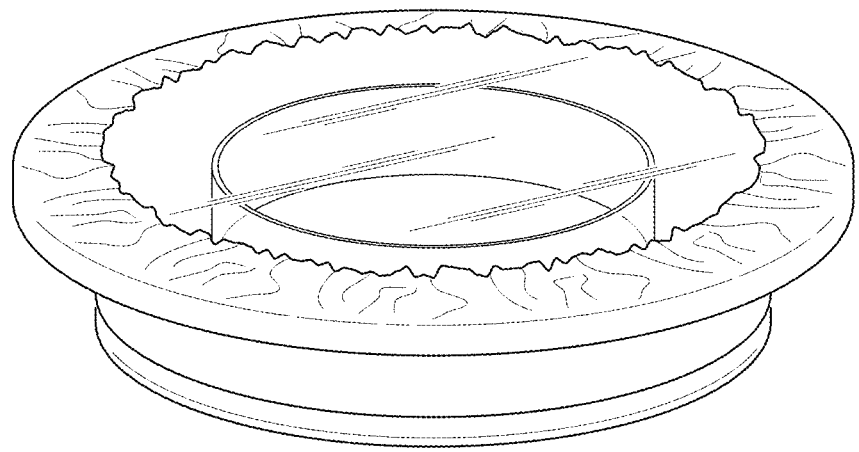
Figure 10A:
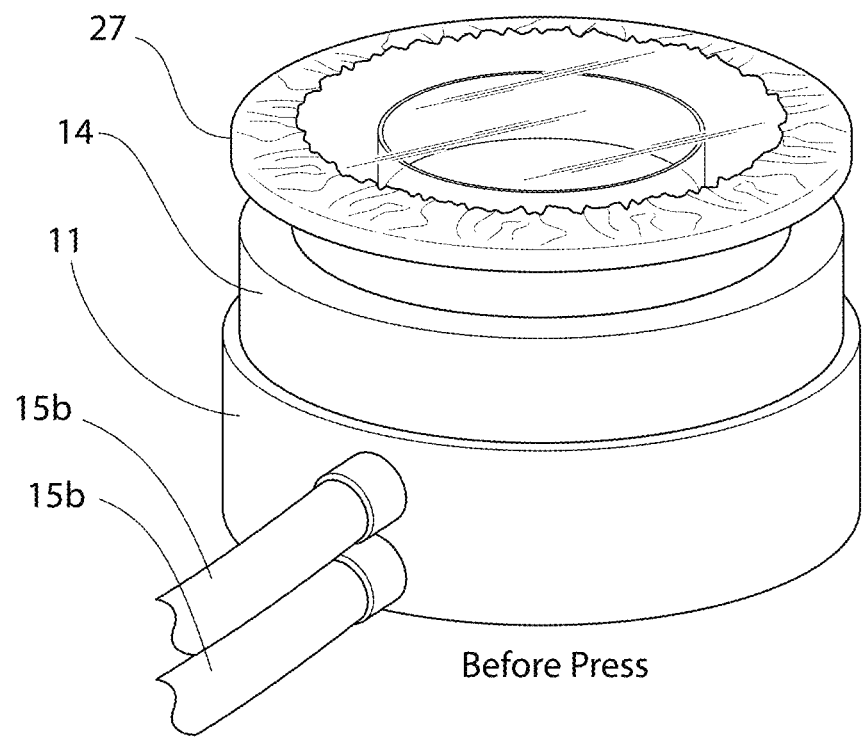
FIG. 10A and FIG. 10B depict side view images of the temperature gradient system before being pressed (FIG. 10A) and after being pressed (FIG. 10B).
Figure 10B:
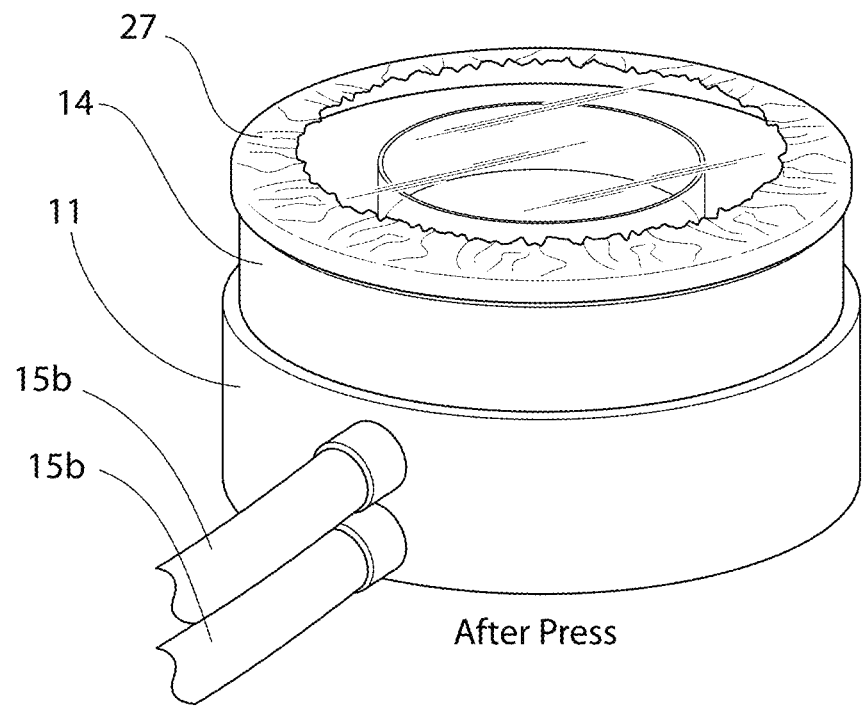

In some embodiments, flexible element 23 is a section of a bellows hose, as shown in FIG. 8A and FIG. 8B. As depicted in FIG. 8B, a section of a bellows hose is cut and mounted to the underside of lid 27 with substrate 3 mounted within the bellows hose section. As shown in FIG. 9A, the bellows hose section has an extended configuration, and in FIG. 9B, the bellows hose section has a pressed configuration. In the extended configuration, lid 27 and substrate 3 are in a lifted state, such that substrate 3 is not in contact with temperature elements 1 and 2 (FIG. 10A). In a pressed configuration, lid 27 and substrate 3 are in a lowered state, such that substrate 3 is in thermal contact with temperature elements 1 and 2 (FIG. 10B). This enables the interior of chamber 14 to reach a specific level of humidity before allowing contact between substrate 3 and temperature elements 1 and 2. This aspect of the invention also allows temperature gradient 7 to be stable and unaffected by air flow when introducing samples to temperature elements 1 and 2.

Electromagnetic Sample Introduction

Figure 11:
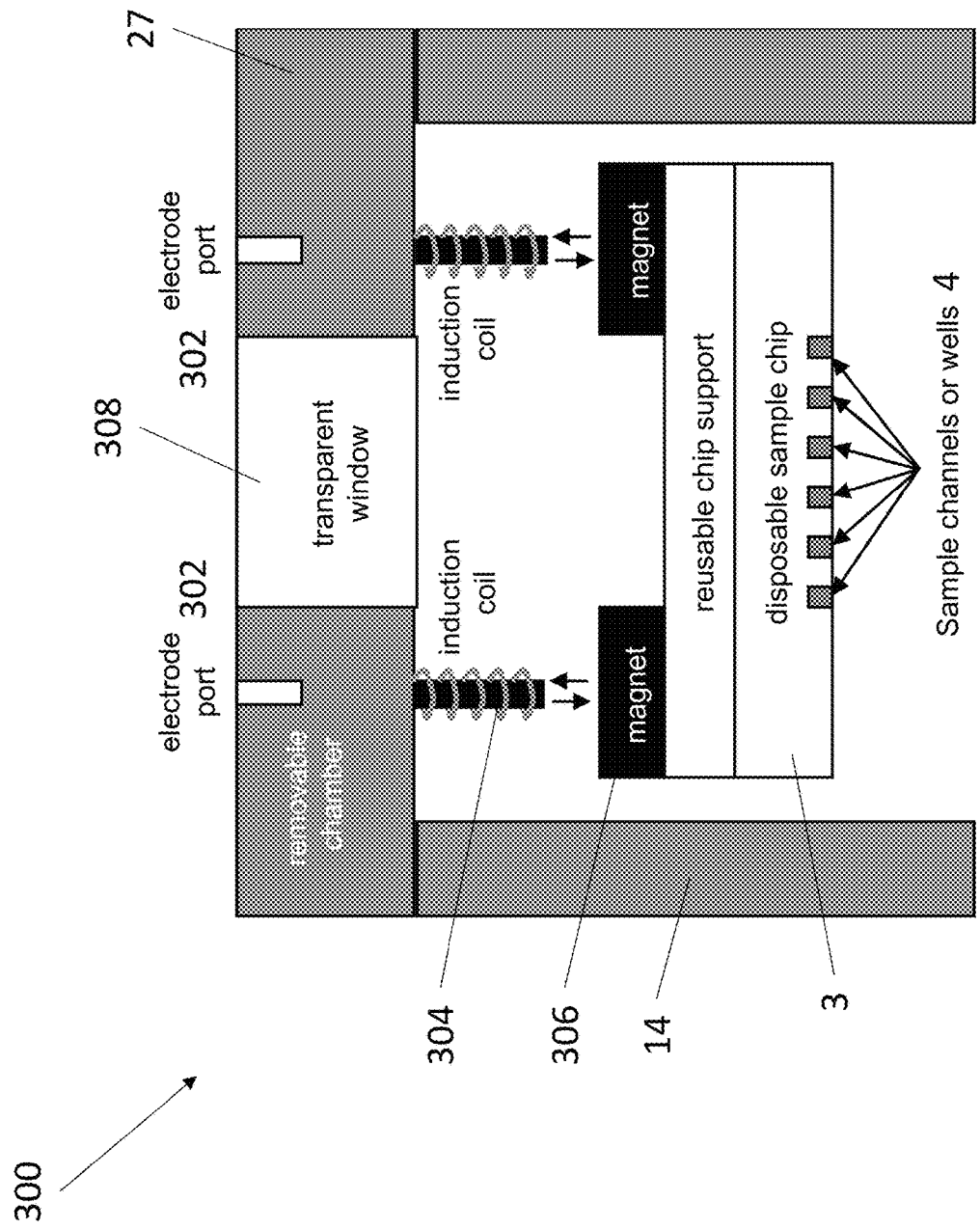
FIG. 11 depicts a schematic of a magnetic induction coil design for a sample chamber.

Referring now to FIG. 11, in one exemplary embodiment of this invention, the temperature gradient system may further include an electromagnetic sample introduction unit 300. Electromagnetic sample introduction unit 300 is configured to place a sample on temperature elements 1 and 2 simultaneously and immediately after stabilizing the climate conditions of chamber 14. Electromagnetic sample introduction unit 200 thereby also facilitates quick establishment of a temperature gradient across a sample without substantially affecting the interior conditions of chamber 14.

Electromagnetic sample introduction unit 300 comprises lid 27 attached to chamber 14 and at least one externally accessible electrode port 302, each electrode port 302 electrically connected to an induction coil 304 mounted to the underside of lid 27. A substrate 3 is mountable to the underside of lid 27 by one or more attached magnets 306, the position of each magnet 306 being complementary to the position of each induction coil 304. Each induction coil 304 can thereby be powered on and off by a respective electrode port 302 to attract and release magnets 306, wherein substrate 3 is held by induction coils 304 when powered on and released when induction coils 304 are powered off. In some embodiments, lid 27 further comprises window 308 to facilitate substrate 3 alignment and imaging.

In certain embodiments, induction coils 304 further provide a heating feature. For example, it may be necessary to preheat a fluid sample if samples are expected to undergo LLPS above room temperature. Induction coils 304 can thereby preheat an attached substrate 3 to ensure homogeneity in loaded samples prior to introducing samples to temperature elements 1 and 2.

Figures 12A, 12B, 12C:
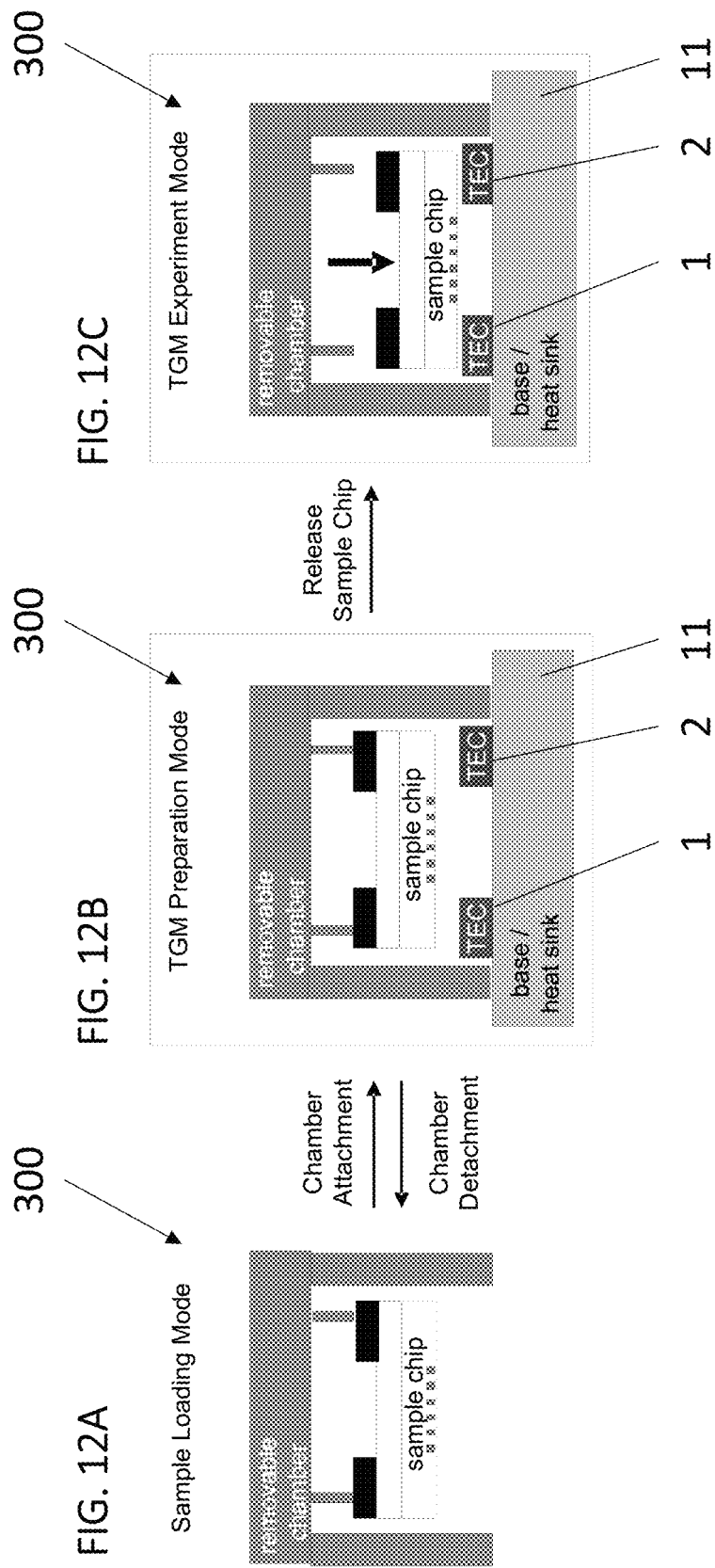
FIG. 12A through FIG. 12C depict sample loading for automated sample placement.

Sample introduction by way of unit 300 is depicted in FIG. 12A through FIG. 12C. Induction coils 304 are powered on to facilitate the attachment of a substrate 3 to the underside of lid 27. Unit 300 is placed on top of a temperature gradient system and positioned to align substrate 3 with temperature elements 1 and 2 on base/heat sink 11. Sample introduction to temperature elements 1 and 2 is done by releasing magnets 306 from induction coils 304, freeing substrate 3 from the underside of lid 27.

Method of Use

The present invention also relates to methods of using the systems and devices described elsewhere herein. The methods are useful for high throughput probing of phase transition behaviors of macromolecules, both thermodynamically and kinetically in solutions including but not limited to LLPS and in situ gelation measurements of antibodies, proteins (such as biological intrinsically disordered proteins), oils, food formulations, polymers, and the like.

In various embodiments, the method comprises the steps of: 1) providing a temperature gradient device having a chamber housing a first temperature element and a second temperature element separated by a gap space; 2) loading at least one fluid sample into a fluid sample holder sized to span the gap space between the first and second temperature elements; 3) providing a first higher temperature using the first temperature element and providing a second lower temperature using the second temperature element; and 4) placing the fluid sample holder on the first and second temperature elements such that a first end of the fluid sample holder touches the first temperature element and a second end of the fluid sample holder touches the second temperature element. Phase transition phenomena of the fluid samples within the fluid sample holders can then be observed or recorded using any of the imaging and microscopy setups described elsewhere herein.

In some embodiments, the chamber has an interior that is climate controlled. The method further comprises steps of selecting interior conditions within the chamber. In some embodiments, the method comprises a step of selecting an interior condition having a percent humidity. The percent humidity can be any suitable percent, such as a percent humidity below 50%, below 25%, below 10%, below 5%, or below 1%. In some embodiments, the method comprises a step of selecting an interior condition having a temperature. In some embodiments, the selected temperature is ambient or room temperature, typically between about 20 and 25° C. In some embodiments, the selected temperature can be selected on the basis of a fluid sample. For example, certain fluid samples may prefer a temperature higher or lower than room temperature to maintain homogeneity. In various embodiments, the selection of the interior conditions within the chamber occurs in a single step prior to sample introduction. In certain embodiments, the selection of the interior conditions is maintained throughout the steps of the methods.

The fluid sample holder can be selected from channels, capillaries, wells, and combinations thereof as described elsewhere herein. Channels and capillaries can be loaded by injection or by capillary action. Channels and capillaries can be sealed using a permanent or a removable plug, such as an amount of a wax, a sealant, a glue, a stopper, and the like. Wells can be loaded using pipettes or automated pipetting devices as would be understood in the art. In some embodiments, a fluid sample can be modified such that LLPS and other temperature phase phenomena are observable within the temperature ranges attainable by the first and second temperature elements. For example, excipients may be added to a fluid sample to raise or lower the temperature at which a phase phenomena occurs without changing the phase change profile of the fluid sample. Non-limiting examples of excipients include polymer solutions (such as polyethylene glycol), protein solutions, buffer solutions, salt solutions, and the like. In some embodiments, the fluid sample holders are incubated at a selected temperature to establish homogeneity of fluid samples contained therein.

The placement of fluid sample holders on the first and second temperature elements can be performed in any suitable manner. In some embodiments, the fluid sample holders can be placed manually on the temperature elements.

In some embodiments, a bellows sample introduction unit is provided, as described elsewhere herein. A fluid sample holder may first be mounted to the underside of the lid of a bellows sample introduction unit, followed by the placement of the bellows sample introduction unit over the first and second temperature elements. Once the fluid sample holder has been aligned over the first and second temperature elements and the selected interior conditions of the bellows chamber are attained, the bellows sample introduction unit may be pressed down to place the mounted fluid sample holder onto the first and second temperature elements simultaneously. In some embodiments, an electromagnetic sample introduction unit is provided, as described elsewhere herein. A fluid sample holder may be attached to a magnetic holder and mounted to powered induction coils on the underside of the lid of an electromagnetic sample introduction unit. The electromagnetic sample introduction unit can then be placed over the first and second temperature elements to align the fluid sample holder over the first and second temperature elements. After the selected interior conditions of the electromagnetic chamber are attained, the induction coils may be powered off to release the fluid sample holder onto the first and second temperature elements simultaneously.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out exemplary embodiments of the present invention, and are not to be construed as limiting in any way the remainder of the disclosure.

Example 1

Measuring Phase Transition Temperatures on a Temperature Gradient Device

Phase transition behavior is typically studied in macroscopic sample holders by light scattering, UV-Vis absorption measurements, differential scanning calorimetry, infrared spectroscopy and temperature quenching-centrifugation in the biopharmaceutical industry. However, most of these methodologies have low throughput, i.e. only one temperature experiment at given time, and consume large amounts of samples, i.e. hundreds of microliters The present study investigates devices and methods to measure phase transition temperatures of materials such as liquid crystals, membranes, and polymers. In the biopharmaceutical industry, there is an interest in studying the phase transition behavior of macromolecule solutions; these transitions, such as precipitation, can be utilized as a protein purification step. Measuring liquid-liquid phase separation (LLPS) of liquid drug products of antibody solutions is useful for maintaining long term physical stability. Furthermore, crystalline formulations can be exploited for delivering high concentrations of antibody drug molecules to alleviate the high viscosity situations encountered in delivery. In addition, in vivo gelling of thermos-responsive polymers can be explored for the sustained release and targeted delivery of therapeutic agents.

The proposed temperature gradient microfluidic device has several distinctive advantages for making phase transition measurements. Temperature could be varied along one direction and measured simultaneously with about 2 microliters of sample per channel, while concentration, pH, salt type, salt concentration, osmolyte type, or different solute chemistries is varied along another. This would enable hundreds or even thousands of protein solutions to be monitored simultaneously with very rapid sample setup and only minimal material requirements. This setup allows obtaining large data sets for phase transitions as well as the kinetics of aqueous two-phase system formation. The cloud point measurements provide vital thermodynamic clues about protein-protein interactions and the kinetics of phase transition behavior should help guide formulation of monoclonal antibody solutions to avoid and/or slow down the phase transition, beneficial to the long term physical stability of protein solutions at high protein concentrations.

Temperature dependent monitoring of reactions is particularly useful for kinetics studies. The Arrhenius equation (3) can be used to determine the activation energy, $E_a$, for a chemical or biochemical reaction:

$$\ln k = \ln A - \frac{E_a}{RT} \quad (3)$$

In equation (3), k is the known rate constant for a reaction, A is a pre-exponential factor, T is temperature, and R is the gas constant (8.314 J/K-mol). Running the reaction at several different temperatures and plotting ln k v. 1/T yields a line with a slope of $-E_a/R$ and a y-intercept of ln A.

Monitoring the thermal transition between double stranded (ds) dsDNA and single stranded (ss) ssDNA is the principle diagnostic tool used in many DNA-based assays. For example, during PCR amplification, the melting curve of dsDNA is used to follow reaction progress and product purity. A single base pair mismatch reduces the amount of hydrogen bonding interactions in the ds species, therefore the transition temperature $T_m$ of complementary dsDNA will be higher than the $T_m$ of dsDNA with a mismatch. Although measuring DNA melting curves is essential for these techniques, current methods are hindered by the need to ramp the temperature sequentially. In PCR this is often done with a special thermal cycler.

Temperature gradients according to the present invention afford a convenient, one-shot method of obtaining a melting curve for dsDNA. An intercalation dye, for example SYBR Green I, is mixed with DNA samples and injected into a microchannel array. The experiment can be monitored using fluorescence microscopy. SYBR Green I is known to fluoresce when it is intercalated between stacked base pairs of dsDNA and to lose its fluorescence in aqueous solution. Therefore, a melting curve for dsDNA can be generated by monitoring for the loss of dye fluorescence as a function of temperature.

This method has several advantages compared to conventional DNA melting curve measurements. While standard techniques usually require at least hundreds of microliters and tens of minutes for a single curve, the present invention allows the same measurement with hundreds of nanoliters in just one shot (i.e. a few seconds). Because the fluorescence at all temperatures is detected simultaneously, the signal-to-noise ratio of the overall process is improved with respect to sequential analysis. This is because any variations in the light source intensity or detector yield as a function of time are avoided. Furthermore, the intercalation dye is subjected to far less photo and thermal damage due to the reduction in time of exposure to the excitation source and to temperature extremes. The geometry of this method can be adapted to acquire multiple DNA melting curves simultaneously by injecting different DNA strands into each channel and employing the strategy described below for multidimensional on-chip analysis.

In another aspect, in the area of in vivo gelling of thermo-responsive polymer, the same microfluidics platform can be used to study in situ gelling behavior to guide the composition design of the polymer solution to meet the target product profile from a drug delivery point of view.

Instrumentation

Figure 13:
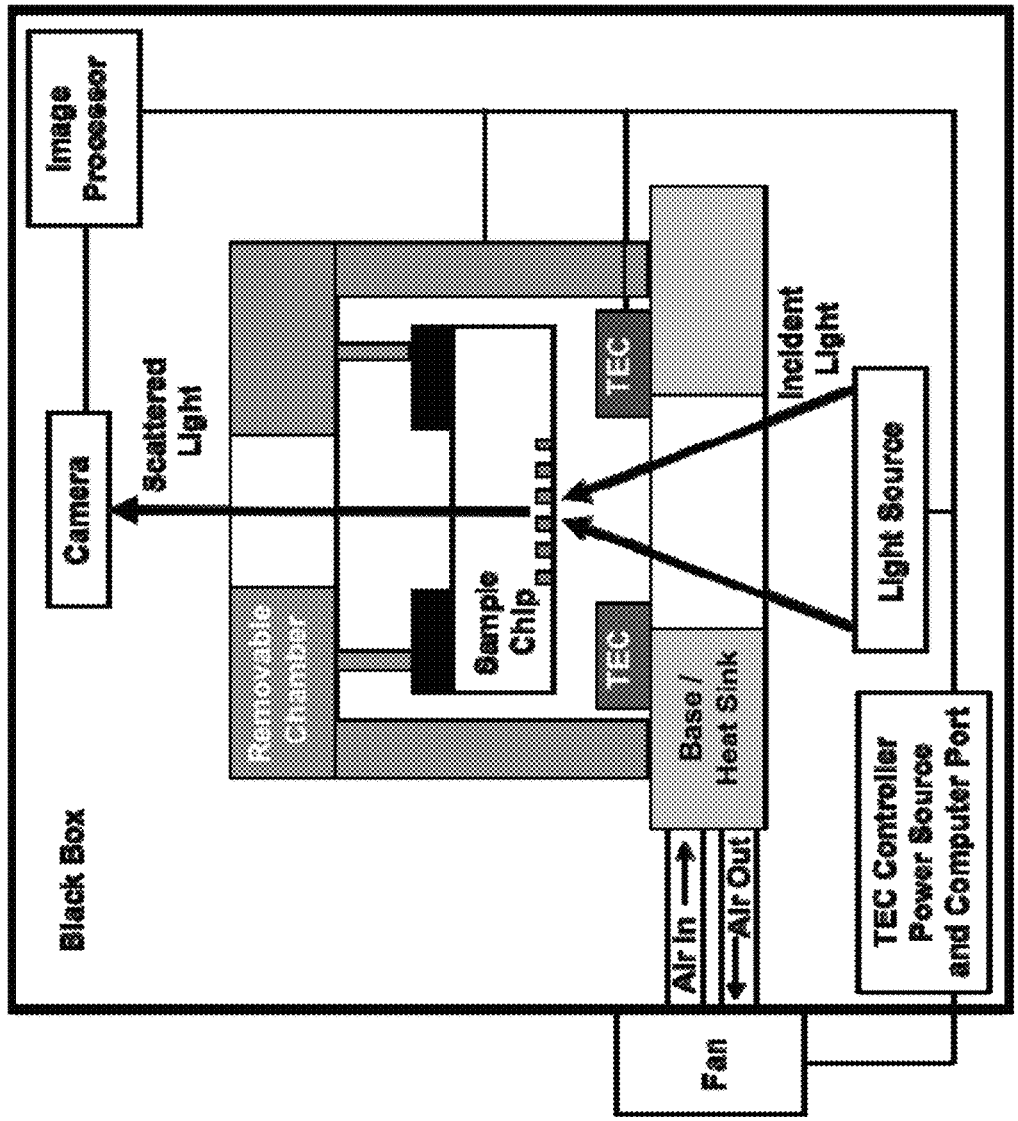
FIG. 13 depicts a diagram of a black box temperature gradient device. The arrows denote the light path. The components are connected by solid black lines representing electrical connections.

The basic components of the temperature gradient instrument are optics for dark-field imaging, hardware for generating a temperature gradient, a chamber to hold and direct the sample chip, and software to control the instrumentation and perform image analysis. Pictures of an experimental setup are provided in FIG. 1C and FIG. 1D. A schematic of an exemplary setup is depicted in FIG. 13. The exemplary setup replaces large components with smaller alternatives and includes automated methods to introduce samples onto the temperature gradient. Software packages are included to run experiments and extract the metrics of protein-protein interactions (e.g. $T_{ph}$ and $E_A$).

Digital Camera-Based Optics

Dark-field microscopy requires a conical light source and optics to collect the scattered light (black arrows in FIG. 13). The device uses a ring of white-light LEDs for illumination. This can be interchanged with a smaller ring of monochromatic LEDs. The monochromatic light source simplifies data analysis since the light scattering cross section from protein-rich droplets is wavelength dependent.

Figure 1C:
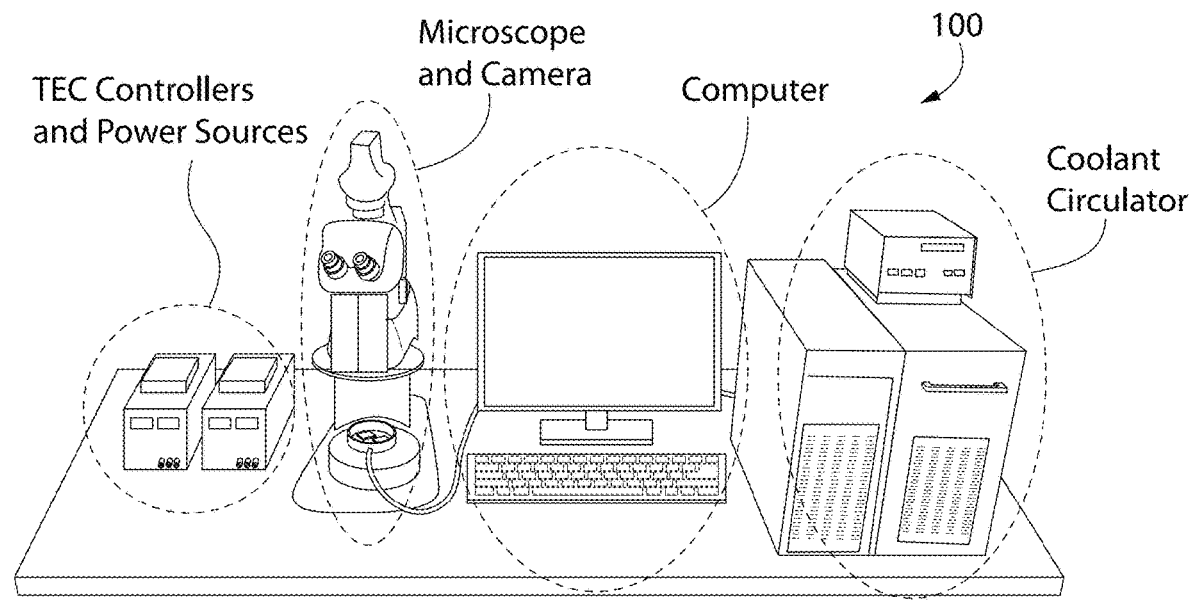
FIG. 1C depicts an experimental setup of a temperature gradient instrument with primary components marked.
Figure 1D:
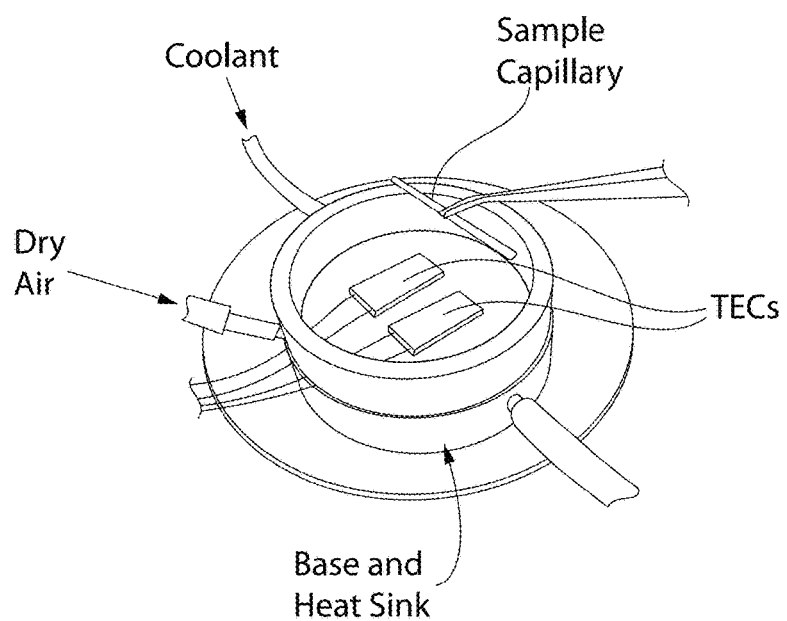
FIG. 1D depicts a magnified view of the sample chamber.

The Nikon SZM18 microscope used in FIG. 1C is interchangeable with any digital camera set-up. Preliminary tests with an 8-bit digital camera show effective results: FIG. 14A shows an image of a capillary tube containing poly N-isopropyl acrylamide (PNIPAM) on the temperature gradient, which was obtained with an 8-bit digital camera. Like elastin-like proteins (ELPs), PNIPAM undergoes hydrophobic collapse at high temperature, above the lower critical solution temperature (LCST). Even the low dynamic range of a very cheap 8-bit camera (value under $90) was adequate to observe clouding at high temperature (right-hand side of FIG. 14A). Moreover, the onset of the LCST could be quantified by making a line scan of the scattering intensity along the temperature gradient (FIG. 14B). A digital camera having a greater resolution should be adequate for this instrument (e.g. SLR, Cannon M6 EOS 24.2 MP).

Temperature Gradient Hardware

When current flows through a thermoelectric cooler (TEC) plate, one side of the plate becomes hot while the other gets cold. For some proteins, liquid-liquid phase separation (LLPS) occurs at very cold temperatures (e.g. −15° C.). Commercially available TECs (TE Technology, Inc. TE-63-1.0-1.3) can easily achieve ΔT values of 40° C. In order to reach cold temperatures on the upper-side (i.e. sample-side) of the TECs, however, it is necessary to extract heat from the hot side. A coolant circulator can be employed for this purpose (FIG. 1C). This can be replaced by a fan-based heat sink, which is far smaller. Next, the current design uses a separate controller (TE Technology, Inc. TC-48-20) and power supply (DC Power Supply 30V 5A) for each TEC (FIG. 1C). The alternative design (FIG. 13) employs a single power source and a multichannel TEC controller to further reduce the size. Moreover, this controller and power source unit can be connected to a computer for programming temperatures. Thermistors can be fixed to the top of the TEC plate to measure the temperature. The measured values can be sent back to the controller and the current flow can be adjusted accordingly. This feedback loop can maintain a constant temperature on the top of the TEC plate, where the sample is introduced.

Sample Chamber

The chamber is an aluminum cylinder with a detachable glass cover (FIG. 1D). Samples are loaded into silica capillary tubes by capillary action, sealed with wax, and manually placed onto the TECs. A removable sample chamber can be used to automate sample placement onto the temperature gradient (FIG. 12A through FIG. 12C). To begin an experiment, the sample chamber is removed from the box to install a sample chip (FIG. 12A). Next, the chamber is reattached above the TEC plates (FIG. 12B) and the temperature gradient is prepared. In the final step, the sample chip is dropped onto the pre-equilibrated TEC plates (FIG. 12C). Upon release, dark-field imaging commences to track LLPS and aqueous two-phase system (ATPS) formation.

The chamber is fitted with a set of induction coils, as depicted in FIG. 11. These coils serve two purposes. Their first function is to apply a magnetic field to hold the sample chip onto the chamber. The sample chip is constructed with a reusable support fitted with magnetic stamps to connect to the induction coils. The disposable sample chip sits below this support to house the sample containing-channels, positioned along the bottom of the chip. The induction coils also apply heat to the sample. Preheating the sample-chip prior to a temperature gradient experiment is necessary because some solutions undergo LLPS above room temperature. These solutions are loaded warm to ensure solution homogeneity before the experiment starts.

When the chamber is reattached (FIG. 12B), the sample chip is held above the TECs. At this point, the temperature and humidity in the box are checked. It is important to keep the moisture level below the dew point so that water does not condense on the cold TEC plate. Condensed water will disrupt thermal contact with the sample chip and the TEC plate, compromising the linearity of the temperature gradient. Humidity can be reduced in the chamber by a slow stream of dry air (FIG. 1D). An environmentally controlled chamber aids in preserving temperature and humidity. After the temperature and humidity fall within acceptable ranges (this should take about 5 minutes to equilibrate), the TECs will be activated and set to the desired temperatures (about 1 minute to equilibrate) before an experiment is started. Finally, the magnetic induction coils will be turned off so that the sample chip drops into place on the pre-equilibrated temperature gradient, thereby initiating the temperature gradient experiment (FIG. 12C).

Sample Chips

The temperature gradient device can use disposable sample chips. Currently, silica capillaries are used to hold samples (FIG. 1D and FIG. 5C (A)). Silica surfaces are hydrophilic and resistant to protein surface fouling and can be employed in a capillary array. Printable plastics for the chip materials (FIG. 5C (B)), like PDMS, can also be used. In the absence of surface effects, LLPS should be reversible because the proteins remain folded. Channel-based chips offer continuous temperature resolution (FIG. 5C (C)), where the LLPS can be monitored at 100 s of temperatures, simultaneously. The temperature resolution will only be limited by the image resolution. Thermophoresis, the migration of chemicals along a temperature gradient, is a potential drawback of channel-style chips. Well-arrays can also be used (FIG. 5C (D)). The linearity of the temperature gradient across these chips will be validated by measuring the fluorescence of temperature-sensitive dyes and nano-particles. Ultimately, the sample chips can be loaded by a specialized multi-channel pipette and employ a self-sealing mechanism (FIG. 5C (E)-(F)). One side of the well or channel will be left open with the other sealed by a capillary glass slide. After loading the channels (FIG. 5C (E)), the open side is sealed with a second glass slide (FIG. 5C (F)).

Protein Spiking Method to Prepare Protein Solutions with PEG and Excipients

Samples are prepared from a protein stock (protein in water) and an excipient stock (PEG, buffer, salt, etc.). The two stock solutions are mixed volumetrically, and PEG titrations are carried out to bring $T_{ph}$ into an experimentally accessible range.

Sample Preparation for Temperature Gradient Experiments

High concentration protein stock solutions are heated above the phase separation temperature 30 minutes and mixed periodically to ensure homogeneity. To prepare for temperature gradient microfluidics (TGM) measurements, the solutions were loaded into 12 mm×1 mm×0.1 mm rectangular borosilicate glass capillary tubes (VitroCom, Inc.), by capillary action, and sealed with wax to avoid sample evaporation and convection. For some solutions the value of $T_{ph}$ is well above room temperature. As such, the capillary tubes can be placed in contact with a hot plate housed within an incubator during the loading process. The high temperature environment ensures that the protein solutions were held above the phase transition temperature. Capillary arrays are then prepared by taping several capillaries together. The arrays were stored above the phase transition temperature in an oven for 10 minutes prior to subjecting them to the temperature gradient experimentation.

Measuring Phase Transition Temperatures on a Temperature Gradient Device

The temperature gradient was calibrated for each experiment using two reference solutions placed alongside samples of interest. The calibration references can contain thermoresposive polymers that exhibit lower critical solution temperatures (LCSTs). The LCST of each reference solution can be obtained with a melting point apparatus that measured light scattering as the temperature. When placed onto the temperature gradient device, the reference solutions became cloudy at temperatures above the LCST. The pixel position of the LCST can be obtained by the onset of light scattering intensity relative to the low intensity baseline on the cold side of the capillary. The temperature gradient was calculated using the pixel positions and the LCSTs of the two samples, assuming a linear relationship between position and temperature.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A temperature gradient device comprising:
a planar, horizontally oriented base;
a first thermoelectric cooler (TEC) having a hot surface and a cold surface, the first TEC positioned on the base with the hot surface facing upwards;
a second TEC having a hot surface and a cold surface, the second TEC positioned on the base a distance away from the first TEC with the cold surface facing upwards;
a sample holder separated from the first and second TEC and configured to move into contact with a first end on the first TEC and a second opposing end on the second TEC; and
a chamber secured to the base enclosing the first TEC, the second TEC, and sample holder, and a lid configured to seal the chamber;
wherein the lid is attached to a flexible element configured to suspend the sample holder above the first and second TEC and maintain an open chamber in a lifted state, and lower the sample holder for simultaneous contact with the first and second TEC while sealing the chamber in a lowered state.

2. The device of claim 1, wherein the first TEC and the second TEC are configured to generate a substantially linear temperature gradient between the first end and the opposing second end of each of the sample holders.

3. The device of claim 1, wherein the first TEC and the second TEC are independently controllable.

4. The device of claim 1, wherein at least a portion of the base comprises a heatsink touching the first TEC, the second TEC, or both.

5. The device of claim 1, wherein the base is connected to at least two leveling screws.

6. The device of claim 1, wherein the first TEC and the second TEC are separated by an adjustable distance of between about 10 μm and 10 cm.

7. The device of claim 6, wherein the base comprises an opening having a width that is equal to or greater than the distance between the first TEC and the second TEC.

8. The device of claim 7, wherein the opening is configured to permit the passage of a light beam path through a section of the one or more sample holders bridging the distance between the first TEC and the second TEC, wherein the light beam path is capturable by a microscope objective configured for a microscopy technology selected from the group consisting of: light field microscopy, dark field microscopy, fluorescence microscopy, raman microscopy, polarized light microscopy, phase-contrast microscopy, differential interference contrast microscopy, and multiphoton excitation microscopy.

9. The device of claim 1, wherein the lid is at least partially transparent.

10. The device of claim 1, wherein the chamber comprises at least one gas inlet and at least one gas outlet.

11. The device of claim 10, wherein the at least one gas inlet is connected to a source of dry gas.

12. The device of claim 1, wherein the chamber comprises at least one sensor selected from: a humidity sensor, a tilt sensor, and a temperature sensor.

13. The device of claim 1, wherein the one or more sample holders are selected from the group consisting of: sample channels, sample capillaries, and sample well arrays.

14. The device of claim 1, wherein the lid has an underside having a sample holder mount and a flexible tube section attached such that the flexible tube section surrounds the sample holder mount.

15. The device of claim 1, wherein one or more sample holders are attachable to a sample holder mount such that the one or more sample holders are suspended under the lid.

16. The device of claim 1, wherein the lid can be pressed onto the chamber to compress the flexible element such that attached sample holder is lowered to simultaneously touch the first and second TEC.

17. The device of claim 1, wherein the lid has an underside having at least one induction coiled attached, each induction coil being electrically connected to a respective electrode port mounted on a topside of the lid.

18. The device of claim 17, wherein the one or more sample holders are magnetically attachable to the induction coils such that the one or more sample holders are suspended under the lid.

19. The device of claim 18, wherein the lid can be placed on the chamber and the one or more sample holders are releasable from the induction coils to simultaneously touch the first end of each of the sample holders to the first TEC and the opposing second end of each of the sample holders to the second TEC.

20. A method of probing phase transition behaviors of one or more samples, comprising the steps of:
providing the device of claim 1;
loading the one or more samples into the one or more sample holders;
selecting an interior condition of the chamber;
setting a temperature for the first TEC and the second TEC;
placing the one or more sample holders on the first and second TEC to simultaneously touch the first end of each of the sample holders to the first TEC and the opposing second end of each of the sample holders to the second TEC; and
imaging the one or more sample holders.

21. The method of claim 20, further comprising a step of horizontally leveling the device.

22. The method of claim 20, wherein the interior condition of the chamber is selected for a percent humidity and a temperature.

23. The method of claim 20, wherein the imaging step is performed using a microscopy technology selected from the group consisting of: light field microscopy, dark field microscopy, fluorescence microscopy, raman microscopy, polarized light microscopy, phase-contrast microscopy, differential interference contrast microscopy, and multiphoton excitation microscopy.

* * * * *